Aug. 8, 1950  G. P. HERRICK  2,518,007
AIRCRAFT OPERABLE EITHER AS FIXED OR
ROTARY LIFTING SURFACE TYPE
Filed June 1, 1945  6 Sheets-Sheet 4
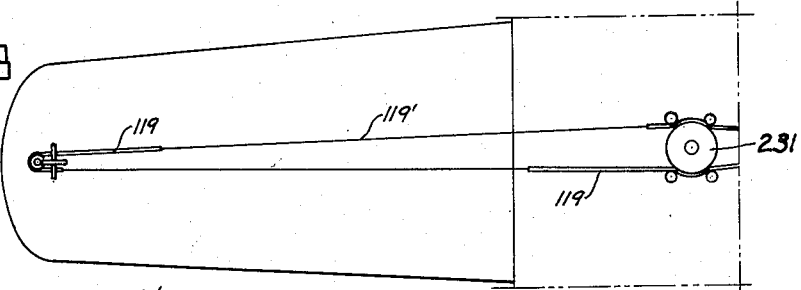
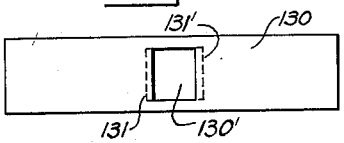
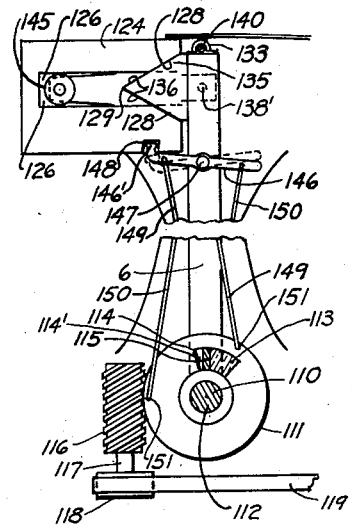
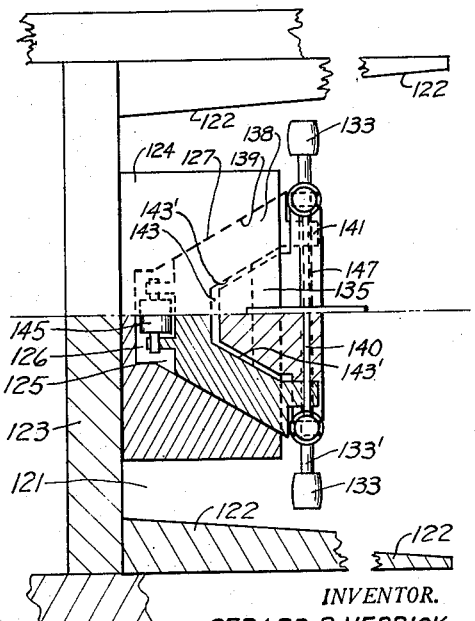
INVENTOR.
GERARD P. HERRICK
BY
Bartlett Eyre Keel & Weymouth
ATTORNEYS

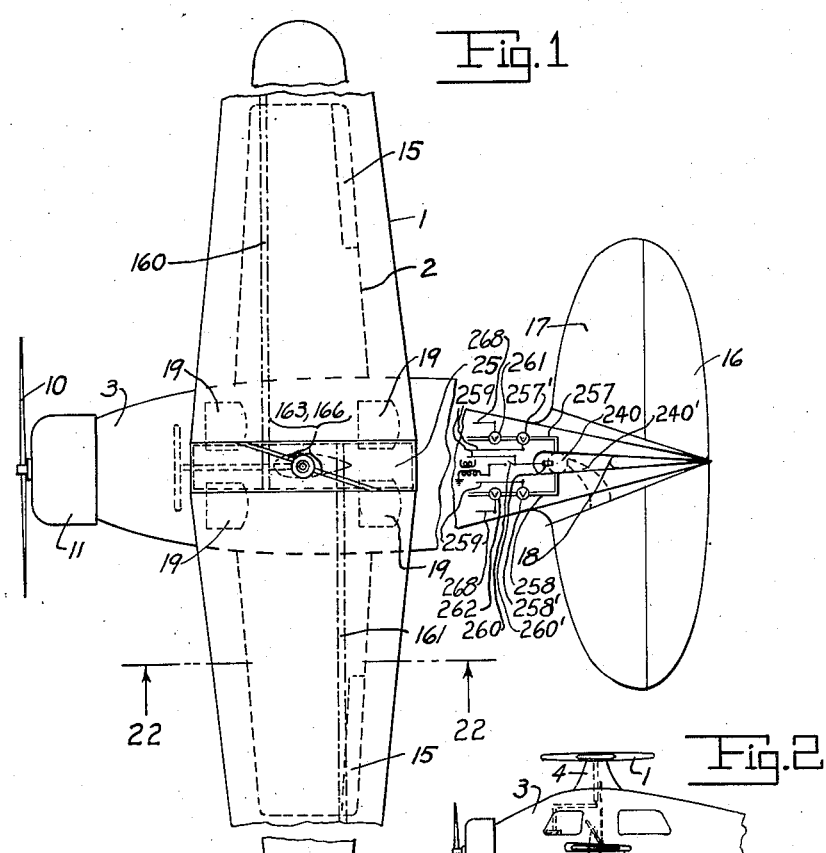

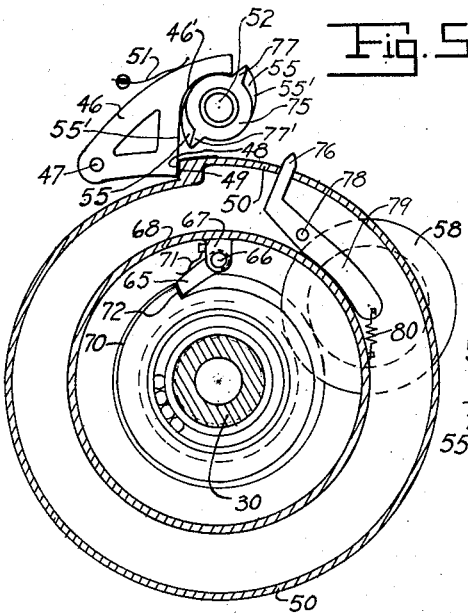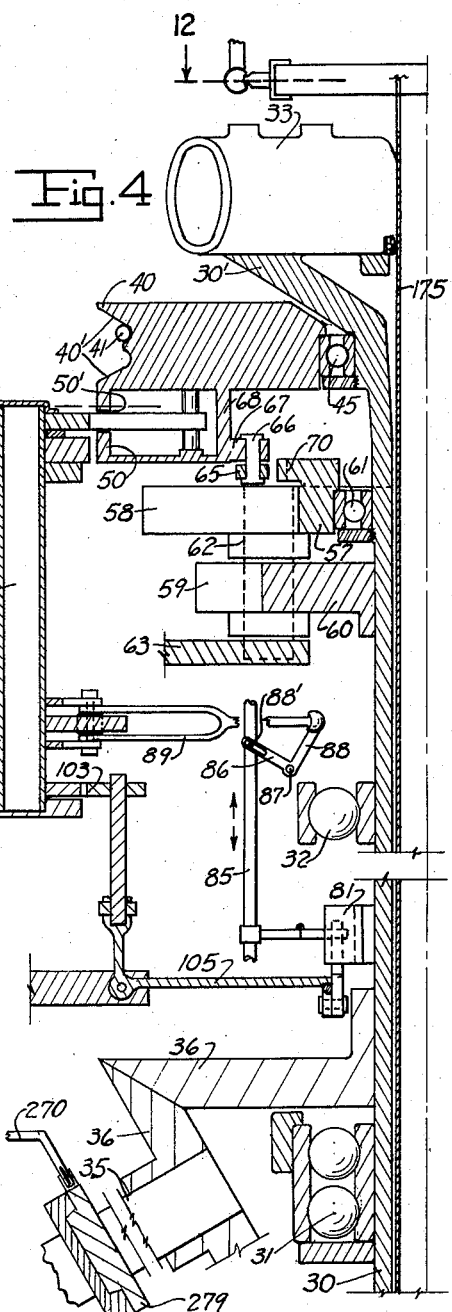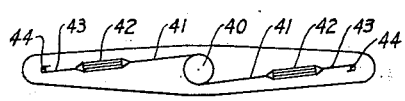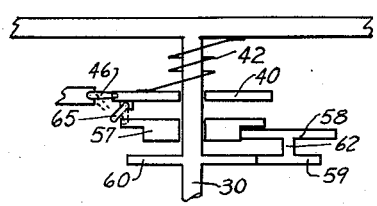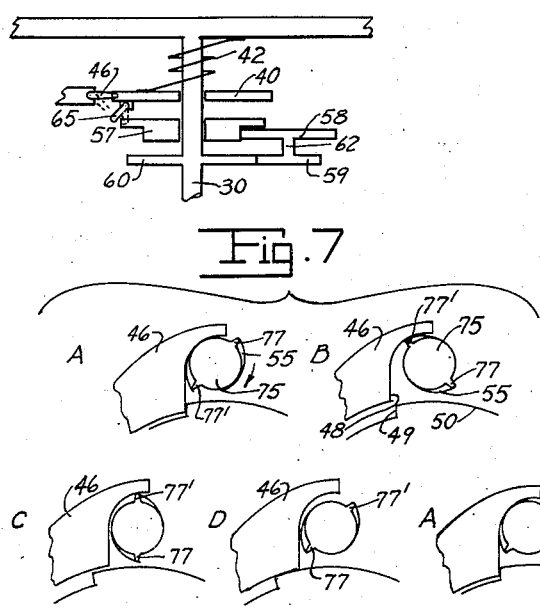

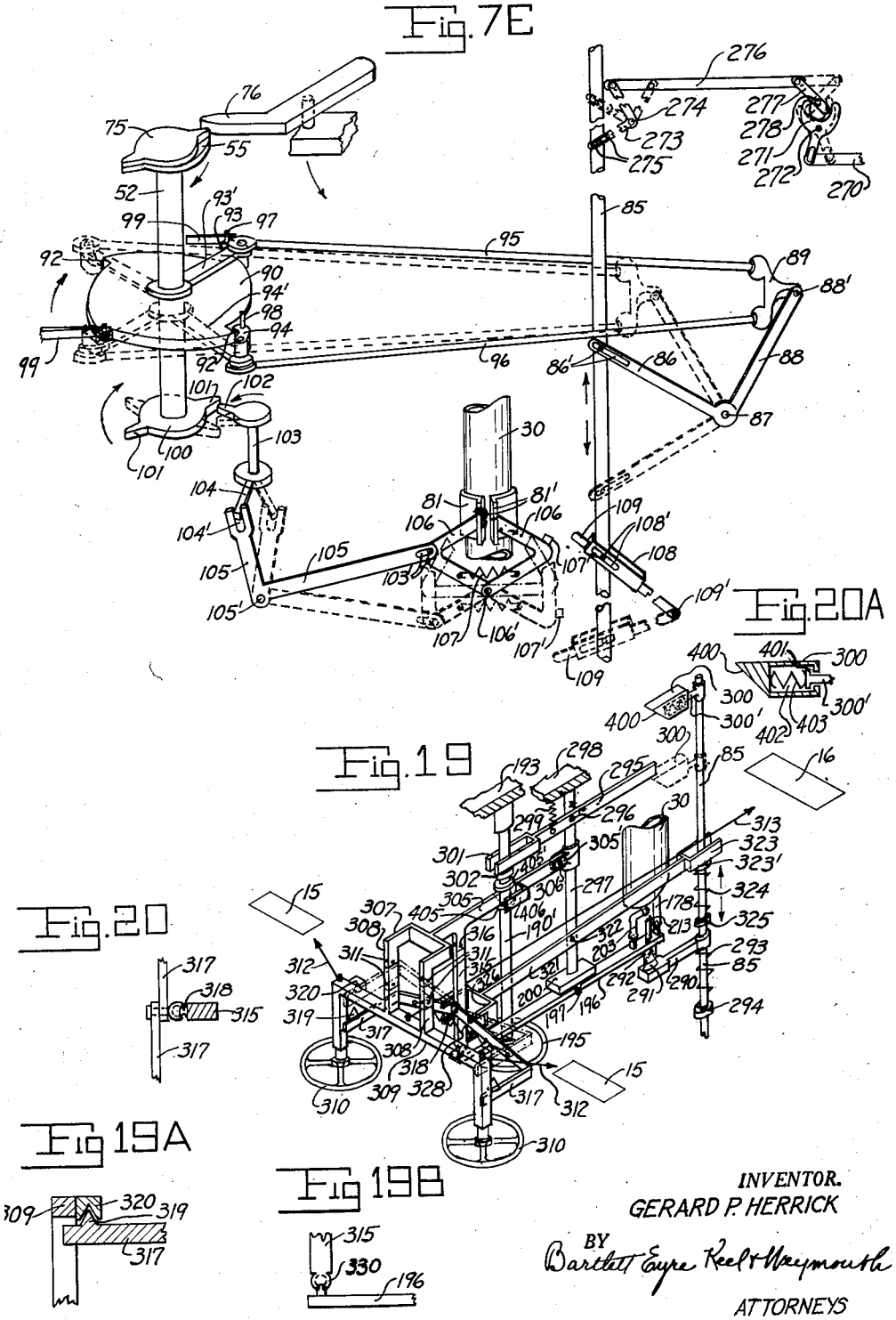

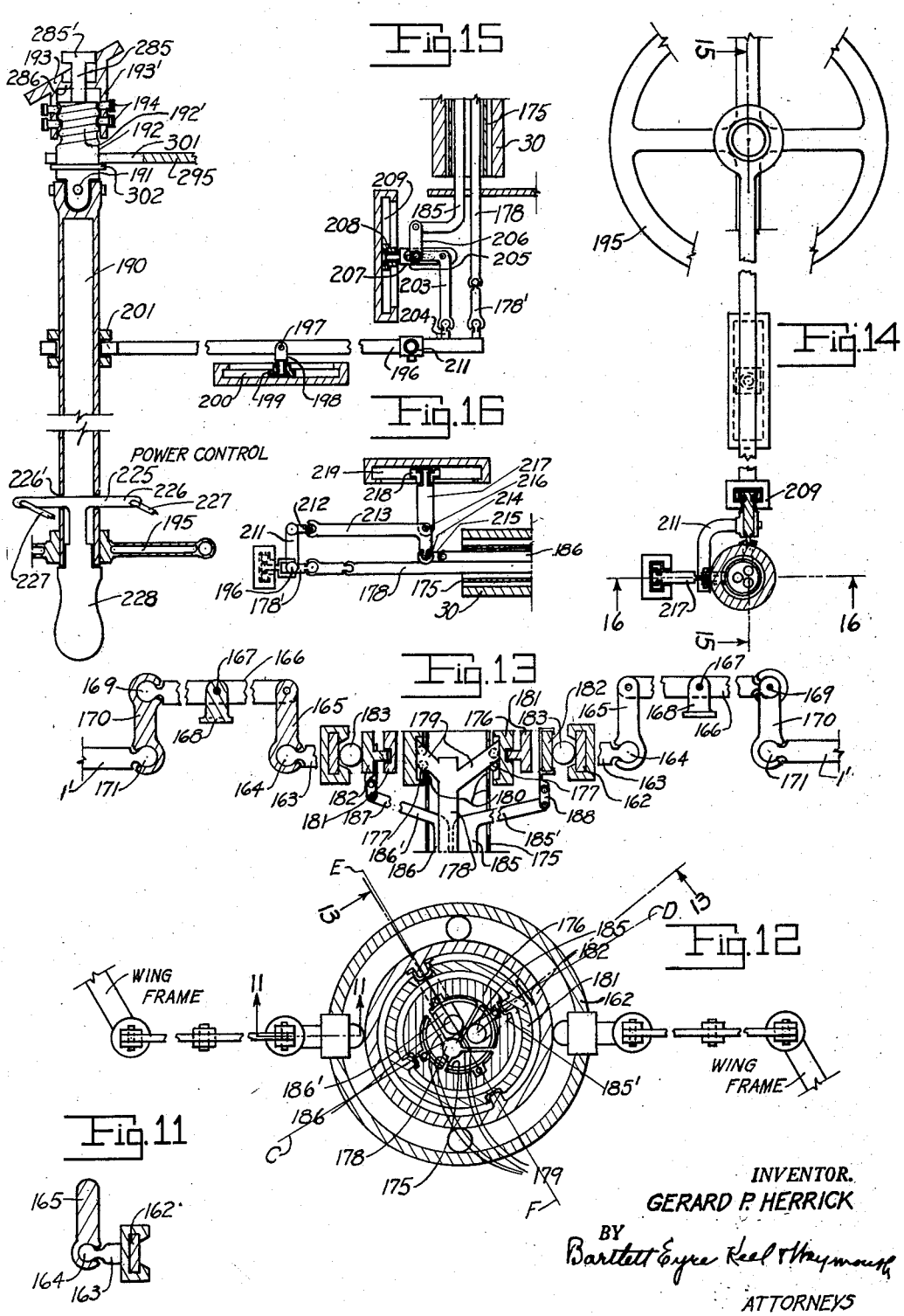

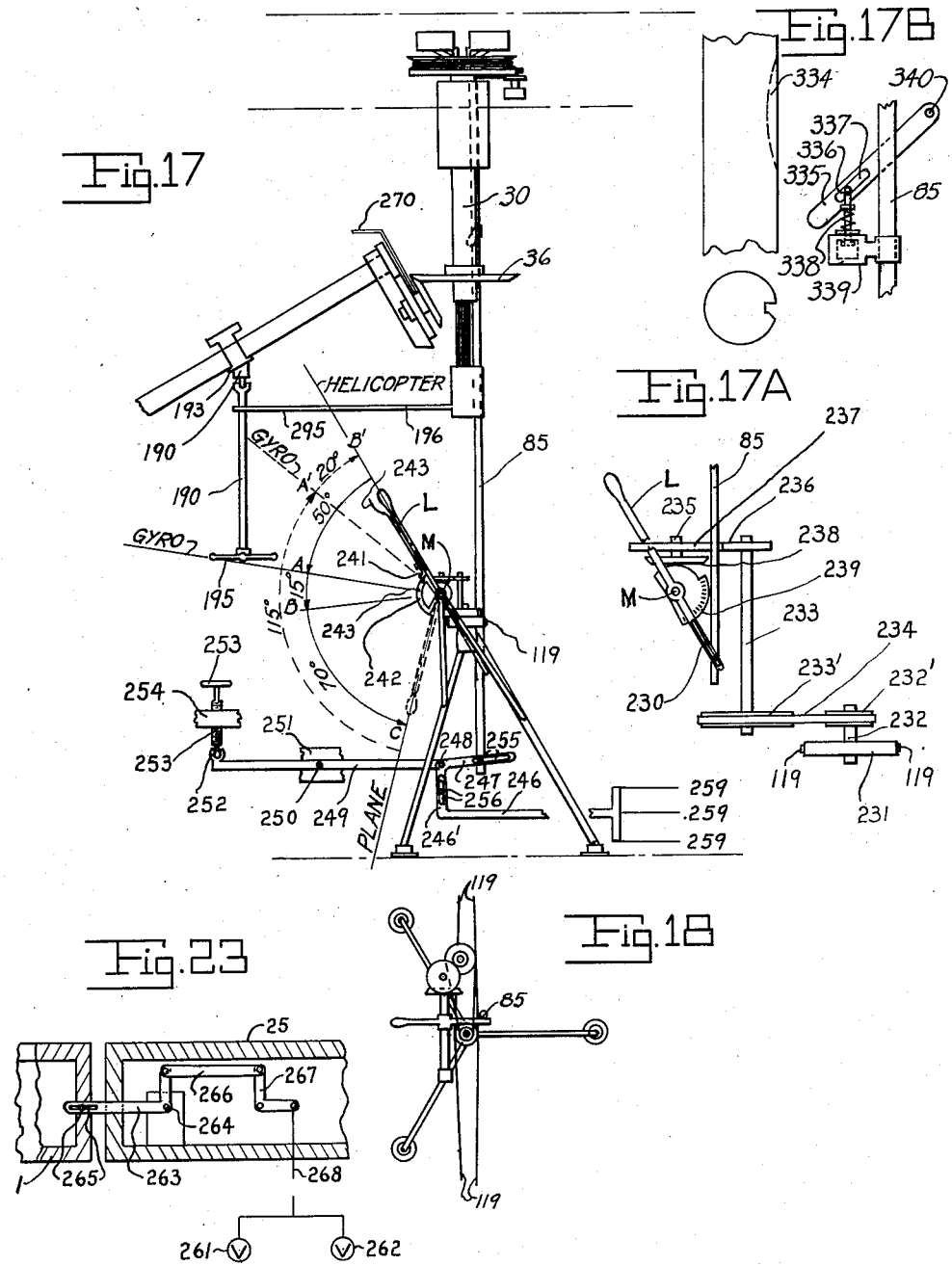

Patented Aug. 8, 1950

2,518,007

UNITED STATES PATENT OFFICE 2,518,007

AIRCRAFT OPERABLE EITHER AS FIXED OR ROTARY LIFTING SURFACE TYPE

Gerard P. Herrick, New York, N. Y.

Application June 1, 1945, Serial No. 596,986

62 Claims. (Cl. 244—7)

This invention relates to aircraft and particularly to aeroplanes adapted to operation both as fixed wing craft and as rotary wing craft.

One object of the invention is a novel and improved combined craft of the above indicated character which is characterized by the ease of control and safety in conversion from either type of flight to another while in the air.

A further object of the invention is a novel and improved means for such conversion from either type of flight to the other while in the air.

A further object of the invention is a multiple means for conversion from one type of craft to the other comprising a single control element which in one direction of movement effects operation of the multiple conversion means to convert the craft from one type of operation to another and in the other direction converts the craft from the latter type to the former.

A further object of the invention is a craft of the above indicated character embodying a combination rotor and wing and novel and improved starting, stopping and orienting means for such rotor-wing and for locking the same in the oriented and fixed position for operation of the craft as a fixed wing plane.

A further object of the invention is a novel and improved motor which is energized by the stopping of the rotor for starting the rotor in the right direction of rotation.

A further object of the invention is a novel and improved means for controlling the angles of incidence of the rotary wing halves which is characterized by operative simplicity and certainty in operation to effect complete control of wing halves individually and collectively for both gyro and helicopter operation.

A further object of the invention is a convertible craft of the above indicated character having also a fixed wing underneath the convertible wing wherein the convertible wing may be readily locked for rigid operation to the fixed wing and with equal facility unlocked therefrom and converted wholly in the air.

A further object is a locking means having the additional function of leveling the rotor-wing to the horizontal in the vertical plane after it has stopped rotating.

A further object of the invention is a combined convertible and fixed wing plane of the above indicated character wherein the fixed wing and tail control surfaces embody the controls for operation of the craft as a wholly fixed wing plane.

A further object of the invention is a novel and improved combined control for the convertible wing and the fixed wing and tail embodying means for readily connecting and disconnecting the fixed plane control from the rotary wing control.

A further object of the invention is a means for cushioning the convertible oscillating wing upon conversion from one type of plane to another.

A further object of the invention is a rotary wing plane which is convertible from gyro operation to helicopter operation and vice versa.

A further object of the invention is a rotary wing craft which is operable either as a gyro or as a helicopter and provided with an anti-torque motor which is started and stopped upon conversion from one type of rotary plane to the other.

A further object of the invention is a rotary plane craft convertible for operation either as a gyro or as a helicopter and provided with an anti-torque motor operable when the craft is operating as a helicopter with the power of the anti-torque motor variable with the torque applied to the helicopter wing.

A further object of the invention is a rotary wing craft operable either as a gyro or as a helicopter and having periodic controls operable for both types of operation and another control operable only for helicopter operation.

A further object of the invention is a rotary wing craft operable either as a gyro or a helicopter having controls which are neutralized in converting from helicopter to gyro and rendered operative upon conversion from gyro to helicopter.

A further object of the invention is a rotary wing craft operable either as a gyro or a helicopter with a power plant for driving said wing as a helicopter and means operative upon conversion to and from helicopter operation for controlling the power of the power plant.

A further object of the invention is a rotary wing craft operable either as a gyro or a helicopter with a variable traction power plant and means for controlling the power plant upon conversion from one type of craft to the other.

A further object of the invention is a rotary wing craft operable either as a gyro or helicopter with an anti-torque power plant and means for varying the power of said power plant responsively to the torque applied to the helicopter wing.

A further object of the invention is a rotary wing craft operable either as a gyro or helicopter with means for varying the power of the power plant driving the helicopter wing responsively to the angles of incidence of the wing halves.

Further objects of the invention will hereinafter appear.

For a better understanding of the invention reference may be had to the accompanying drawings, wherein Fig. 1 is a diagrammatic plan view of a craft embodying the invention;

Fig. 2 is a view similar to Fig. 1 in side elevation;

Fig. 3 is a view similar to Figs. 1 and 2 in front elevation;

Fig. 4 is a sectional view somewhat schematic showing the convertible wing mount assembled with certain parts omitted for convenience in illustration;

Fig. 5 is a sectional view along the line 5—5 of Fig. 4;

Figs. 6A and 6B are schematic views illustrating one embodiment of the means for assisting in stopping and starting of the convertible rotor-wing;

Fig. 7 is a diagrammatic view showing the different positions of a part of the controls shown in Figs. 4 and 5;

Fig. 7E is a schematic view of certain of the control parts of the mechanism shown in Figs. 4, 5 and 7;

Figs. 8, 9, 9A, 9B and 10 are views of one embodiment of the means for leveling the convertible rotor-wing in the fixed position and for locking the convertible wing at points removed from the center thereof to the fixed wing;

Fig. 11 is a sectional view along the line 11—11 of Fig. 12;

Fig. 12 is a view partly in section along the line 12—12 of Fig. 4 illustrating a part of the means for controlling the angles of incidence of the convertible wing halves;

Fig. 13 is a sectional view taken generally along the line 13—13 of Fig. 12;

Fig. 14 is a view of a part of a manual control embodying the invention for controlling the angles of incidence of convertible wing halves and the power of the engine;

Fig. 15 is a sectional view further illustrating the manual control and the hookup with the convertible wing halves along the line 15—15 of Fig. 14;

Fig. 16 is a view similar to Fig. 15 along the line 16—16 of Fig. 14;

Figs. 17, 17A, 17B and 18 are views illustrating manual controls coordinated with the converting means and craft controls for converting and controlling the craft;

Fig. 19 is a perspective view of a control means for manipulating either the plane operation controls or both the latter and the rotating wing controls;

Figs. 19A, 19B, 20 and 20A are detail views of parts of the mechanism shown in Fig. 19;

Fig. 21 is a diagrammatic view of a means for cushioning the rotor against excessive oscillations;

Fig. 22 is a sectional view with parts omitted for convenience along the line 22 of Fig. 1;

Fig. 23 is a diagrammatic view of a part of the control; and

Fig. 24 is a diagram of the sequence of operations in conversion based on the specific embodiment shown herein.

Referring to the drawings, I have illustrated my invention as embodied in an aircraft including an upper convertible rotor-wing or lifting surface and a lower permanently fixed wing 2. The craft includes a suitable fuselage or compartment 3 on the opposite sides from which project the halves of the fixed wing 2 and the convertible wing or rotor 1 is mounted upon the fuselage 3 as by means of the frame structure indicated diagrammatically at 4. The convertible wing or rotor 1 is pivotally mounted on the axis schematically indicated at 5 and Fig. 3 shows in full lines the position of the rotor-wing 1 when it is operating or ready to operate as a fixed wing plane while the dotted lines of the wing indicate a position to which it has been oscillated about the oscillation axis 5 when operating or ready to operate as a rotating wing craft. The convertible wing 1, as will be more particularly set forth hereinafter, is lockable against rotation to the frame of the craft at the central portion thereof and as will more particularly be described hereinafter. It is also locked to the fixed wing 2 at two points remote from the main body or compartment 3, and in the particular embodiment shown it is locked to the outer ends of the wing halves 2 by means of the movable strut structures 6, the full line positions of the struts indicating the position for fixed plane operation of the convertible wing and the dotted line positions of the strut structures indicating the positions where the convertible wing 1 is free to rotate without interference.

The craft is also provided with a traction propeller 10 driven by any suitable engine shown diagrammatically at 11 in the forward end of the fuselage 3. The craft is provided with any suitable landing gear, as for example, the three wheels 12, 13 and 14 shown diagrammatically in Figs. 2 and 3, these wheels for example being positioned for a three point landing. The fixed wing 2 is provided with ailerons 15 for lateral control of the craft particularly when operating as a fixed wing craft, and the craft is provided with the conventional tail control surfaces including an elevator 16, a stabilizer 17 and fin and rudder or vertical control surfaces 18, these being mounted on the rear end of the fuselage 3 in the conventional manner. In the particular embodiment shown in Fig. 1 the fuselage is provided with four seats 19.

In the particular embodiment shown the convertible wing or rotor 1 is provided with a central fore and aft section 25 which may be and is shown as non-oscillatory about the axis 5. This central section 25 of the rotor-wing rotates with the rotor wing on the central rotor frame but does not oscillate about the axis 5 in the vertical plane. The rotor central frame comprises a vertical hollow shaft 30 (Fig. 4) which is suitably mounted for rotation, as for example, within the vertically spaced sets of bearings 31 and 32, these bearings being shown diagrammatically for convenience in illustration. The upper part of the hollow shaft is flared upwardly at the upper end 30' to form a base for mounting the convertible wing. A part of the mount is shown at 33 which may for example carry a shaft or bearing to form the oscillating axis 5 of the rotor, the details being omitted for convenience in illustration.

The convertible wing may be auto-driven by the air or it may be driven from a suitable engine or by a jet or inertia motor. I have shown a drive shaft 35 (Fig. 4) which may derive its power from the engine of any suitable power plant and this shaft 35 is geared to the vertical hollow shaft 30 by means of the drive gears 36. Thus the power from the shaft 35 may be utilized to drive the rotary wing as a helicopter wing or it may be utilized for starting the wing from rest when the wing is to be auto-driven, ference between the pawl or coupling 65 and the shoulder 72 formed on the track.

Thus with the starting motor energized the latter through the pulley and the system of gearing shown, is effective in starting the convertible wing from the rest and bringing it up to a speed for operation then as an auto-rotating wing. Also an important feature of the starting means is that the motor is energized by the rotating wing during the stopping of the same for conversion to a fixed wing and by the improved structure disclosed the energized motor starts the wing from rest in converting from a fixed wing to a rotating wing, operating it in the required auto-operating direction. I will now more particularly describe the operation of converting the rotating wing to a fixed wing, including the energizing of the starting motor and the parts of the structure cooperatively functioning with the structure and mechanism already described.

The control shaft 52 (Figs. 4 and 5) has keyed therewith, to operate in unison with the cam 55, a tripping device 75 which is operated by a trigger 76 in a certain position of the tripping device 75 to release the locking pawl 46, the position of this trigger 76 being controlled responsively to the speed of the pulley 40. The tripping device 75 is provided on diametrically opposite sides thereof, that is on the opposite sides of the axis of the control shaft 52, with lugs 77 both of which lugs may be rotated by the control shaft 52 to positions in the path of the trigger 76 to be engaged thereby when the speed of the wing and the pulley drops sufficiently to permit the trigger to move outwardly. The trigger 76 forms one end of a lever pivoted at 78 to a structural part of the pulley 40 and the other end 79 of this lever, namely the end opposite the pivot 78 from the trigger 76 is heavier than the trigger end of the lever, as for example by being made longer, as shown in the drawings, or by being weighted as may be desired, and a spring 80 or spring toggle having one end attached to the weighted end 79 and its other end to a structural part of the pulley 40 tends to urge the weighted end 79 in a clockwise direction about its pivot 78 towards the axis of the drive shaft 30, pushing the trigger 76 through the opening 50' formed in the strengthening web 50.

When the wing is operating as a rotating wing craft the cams 55 and 75 occupy the position shown in Fig. 7B as above described, with the locking pawl 46 lifted out of locking engagement with the pulley and the lowermost lug 77 of the tripping device 75 is wholly out of the path of the trigger 76 in all positions of the latter and while the craft is thus operating the weighted arm 79 is held out by centrifugal force due to the speed of the pulley in the wing against the tension of the spring 80 to withdraw the trigger 76 within the opening 50' so as not to engage the lug 77 in whatever position it may be at the normal operating speed of the wing. When, however, the convertible wing is to be converted from a rotating wing to a fixed wing the wing is first slowed down by means of a brake 81 shown diagrammatically for braking the shaft 30 (Figs. 4 and 7E). When the wing is slowed down by the brake 81 to a predetermined speed the spring 80 is able to rotate the weighted arm 79 clockwise about the pivot 78 (Fig. 5) to bring the trigger 76 through the opening 50' to a position to engage the lowermost lug 77, as shown in Fig. 7C, the control shaft 52 having been operated to actuate the tripping device 75 to this position. In this position the locking pawl 46 is still held by the cam 55 out of the path of the shoulder 49 of the pulley and accordingly the pulley is still free to rotate, with the rotating wing, pulled by the cables 41. The lowermost lug 77 (Fig. 7C) is now in the path of the trigger 76 and after reduced speed of the pulley, the trigger 76 when it comes around and is sufficiently extended engages this lug 77 to actuate the tripping device 75 and its control shaft 52 to the position shown in Fig. 7D. In the position of Fig. 7D the locking pawl 46 rests upon the pulley part 50 in a position for the lip 48 to engage the shoulder 49 of the pulley when the pulley shoulder 49 reaches the locking pawl. This firmly locks the pulley in the fixed position against rotation with the wing and the wing continuing to rotate through the inertia and the auto-rotating couple winds the cables 41 (Fig. 6A) about the pulley 40 to energize the elastic cord units 42. This winding continues until tension in 42 stops the rotor-wing rotating in the counter-clockwise direction. The energized motor unit 42 then starts the wing rotating in the reverse direction with the motor unit tending to unwind the cables 41 about the pulley 40, the pull on one end of the cables 41 tending to hold the pulley 40 locked against the locking pawl 46 and the reverse rotation of the wing operating the gear 57 and the track 70 in the reverse direction so as to cause the shoulder 72 to engage the end of the overrunning clutch pawl 65 and arrest the rotation of the wing in the desired position. The amount of reverse operation of the rotary wing after the wing comes to a momentary standstill or the angle of reversed movement of the wing depends upon the relative positions of the overrunning clutch pawl 65 and the shoulder 72 at the time of reversal. Assuming only one overrunning clutch pawl 65 is utilized, the maximum reversed angular movement of the rotary wing could be approximately one-half turn which would operate the gear 57 and the track 70 through one corresponding revolution. The track 70 with its shoulder 72 occupies a predetermined position with respect to the relative position of the wing to the fuselage and this relation is such that when the overrunning clutch 65 engages the shoulder 72, as shown in Fig. 5, the convertible wing 1 is in its transverse position with respect to the fuselage, or with respect to the fore and aft axis of the craft when operated as a fixed wing craft. Thus in converting from the rotary wing operation to the fixed wing operation the control shaft 52 is manually or otherwise operated, to move the tripping device 75 from the position shown in Fig. 7B to the position shown in Fig. 7C with one of the lugs 77 in a position to be tripped by the trigger 76. This tripping takes place after the wing is slowed down by the brake 81 to a predetermined value so as to cause the trigger 76 to engage the lug 77 and actuate the tripping device 75 to the position shown in Fig. 7D with the locking pawl 46 resting upon the pulley part 50, whereupon after pawl 46 engages shoulder 49 the energizing of the motor units 42 automatically occurs, the brake 81 having been released and the wing becomes locked in the transverse position after the energizing of the motor as described above.

The control shaft 52 may be operated manually or otherwise in any suitable manner but in the particular embodiment shown I have illustrated it as being operated manually by a means including a pawl and ratchet mechanism shown in Fig. 4 and Fig. 7E and an actuating rod 85. The latter is operatively connected with one arm 86 of a bell crank pivotally mounted at 87, the other provided power is available at the shaft 35. As will be more particularly described hereinafter, however, I have provided novel and improved means for starting the rotation of the rotary wing without the necessity of using the power on the power shaft 35 so as to render the auto-rotation wholly independent of the power plant which furnishes power to the shaft 35.

In the embodiment shown this means for starting the rotor-wing from rest to auto-operating speed includes a motor which may be energized by absorbing energy from the rotor-wing itself, when its motion is being arrested, for starting the wing when it is desired to start the wing rotating from its fixed position. Although any convenient type of motor for starting in which energy may be stored and reused may be used, in the present embodiment this motor comprises a pulley 40 to which are attached a pair of cables 41 (Figs. 4 and 6A) which are capable of being wound respectively about grooves 40' on the periphery of the pulley 40. The other ends of the cables 41 are fastened with elastic shock cord units 42 having the required number of strands and the required power for absorbing the energy in stopping the rotor-wing and starting the pulley 40 and the rotor-wing from rest. The units 42 are connected by cables 43 with the framework of the rotary wing at points 44 toward the wing tips.

The pulley 40 is adapted to be locked to a fixed part of the frame so that the rotor may wind the cables 41 about it and tension the elastic units 42 to provide for storage of energy in the starting motor during the stopping of the rotary wing in conversion from a rotary wing to a fixed wing. The pulley is adapted also to be coupled with the rotary wing at starting to bring the wing from rest up to the desired rotation speed for auto-operation. The pulley is journaled on the outside of the hollow shaft 30 at some convenient point as for example, immediately below the flared part 30', as for example, by means of the bearings 45. The locking of the pulley to the frame for energizing or winding up the motor is effected by a pivoted pawl or latch member 46 (Fig. 5), the latter being pivotally mounted at 47 to a fixed part of the frame of the craft. This locking pawl or latch is provided with a lip 48 which engages a corresponding shoulder 49 formed on a ring-like member either integral with or fastened to rotate with the pulley, this ring structure being designated by the numeral 50, and, in the particular embodiment shown in Fig. 5, is spirally shaped on its periphery to form the shoulder 49. In counter-clockwise rotation of rotor and pulley in rotary flight viewed from above the pawl or latch 46 is urged clockwise into locking position with respect to the pulley in any suitable manner, as for example by a spring 51. Fig. 5 shows the position wherein the convertible wing is fixed for operation as a fixed wing plane and with the starting motor (Fig. 6A) energized for starting the wing if and when the locking pawl 46 is released. This locking pawl 46 is controlled by means of a control shaft 52 which may be journaled on the frame of the craft in any suitable manner, as for example, being journaled for rotation in the fixed frame elements 53 and 54. This control shaft 52 carries a cam 55 which is adapted to engage the locking pawl 46 and lift it counter-clockwise about the pivotal axis 47 to release the pulley 40. To effect this purpose, the pawl 46 is provided with a curved surface 46' on the righthand side thereof against which bears the cam 55, this cam 55 being provided with two diametrically opposite cam surfaces 55' so as to be in position to release the locking pawl 46 in either of these two positions which are 180° apart. When the control shaft 52 is operated to release the locking pawl 46 through the cam 55 the locking pawl 46 and the cam 55 occupy the relative positions shown in Fig. 7B and this is the relative position occupied during the starting of the convertible wing and during its operation as a rotary wing plane.

During the starting of the convertible wing to rotating as a rotary wing, the pulley 40 is geared to the convertible wing so as to rotate the latter at a reduced speed as compared with the speed of the pulley, and in the particular embodiment shown the coupling is such as to rotate the convertible wing through one complete revolution for every two revolutions of the pulley 40. To effect this purpose a system of reduction gearing is provided comprising gears 57, 58, 59 and 60. The gear 57 is journaled by means of a bearing 61 about the hollow rotor-wing shaft 30 and is in mesh with the gear 58. The gears 58 and 59 are mounted on a shaft 62 which is suitably journaled on any convenient part of the framework, as for example, a part of the frame shown diagrammatically at 63. The gear 60 is keyed to the hollow shaft 30 to operate therewith and turn the rotor-wing. To start the rotor the pulley 40 is coupled to the gear 57, by the pawl 65 of the overrunning clutch, to rotate therewith and through the system of reduction gearing shown to drive the shaft 30 at a reduced speed, as for example, the half speed shown in this embodiment, the gears 57 and 58 having a 1:1 ratio and the gears 60 and 59 having a 2:1 ratio as shown. During the operation of the convertible wing as a rotary wing, the system of gearing 57—58—59—60 runs idly, being driven by the gear 60, the pulley 40 being now automatically released from the gear 57 by pawl 65 acting as an overrunning clutch. The coupling means between the pulley 40 and the gear 57, in the particular embodiment shown, comprises an overrunning clutch or pawl 65 pivotally mounted on a pin 66 which is carried by the pulley 40, as for example, by a support 67 fastened to or forming a part of the pulley 40. In the particular embodiment shown this support part 67 is carried by the inner stiffening ring 68 formed on the bottom of the pulley, the outer ring 50 forming another stiffener for the pulley. The overrunning pawl 65 is provided with a track 70 and a spring 71 maintains the clutch 65 in contact with the periphery of this track 70 and the track 70 forms a part of the gear 57. This track 70 is spirally formed and the two ends of the spiral surface are bridged by a shoulder 72 against which the clutch 65 bears during the starting of the convertible wing by the energized motor. The convertible wing is rotated through a predetermined fraction of a revolution or predetermined number of revolutions depending upon the requirements by the starting motor whereupon the wing begins to operate as an auto-rotating wing and speeds up. When the latter happens the track 70 is rotated at a higher speed than the pulley of the rotating power shaft 30 and the pawl 65 then functions as an overrunning clutch, and while the wing is operating as a rotary wing whether driven by the power shaft 35 or whether auto-driven and the track 70 continues to be driven at this greater speed than the pulley 40 during such operation with no interarm 88 of the bell crank lever being pivotally connected at 88' with a forked link or yoke 89. The forked yoke 89 is operated by the member 85 when the latter is moved longitudinally of itself and the connection between the yoke 89 and the control shaft 52 is such as to rotate the shaft 52 through a definite angle in the same direction by both backwards and forward movements of the link 89. In the particular embodiment shown there is keyed to the shaft 52 a ratchet disc 90 having four ratchet teeth 92 with which cooperate actuating pawls 93 and 94. These pawls 93 and 94 are carried by operating arms 93' and 94' suitably journaled on the shaft 52. The yoke 89 is operatively connected with the arms 93' and 94' respectively by the links 95 and 96 and these links or rods 95 and 96 are connected at both ends by means of universal joints so as to avoid binding. When the yoke 89 is moved to the right from the dotted position shown to the full line position, which corresponds to an upward movement of the shaft 85 (Fig. 7E), the pawl 93 engages a tooth 92 on the disc 90 to actuate the disc 90 through the desired angle, namely 45°. The corresponding movement of the link 96 does not actuate the disc 90 through the pawl 94 because the pawl 94 merely slips over the teeth but when the shaft 85 is moved downwardly to move the members 89, 96 to the left, the pawl 94 engages a tooth 92 to move the disc 90 in the same direction through another angle and in the particular embodiment a 90° movement corresponding to the similar 45° movement imparted by the link 95 and the pawl 93. This exact movement of the disc 90 through 90° may be effected in any suitable manner, as for example, by having the pawls 93 and 94 provided with knock-out pins which engage fixed actuators 99 disposed in their respective paths after the disc 90 has been moved through the 90° to disengage the pawl and arrest further movement of the disc 90 by that stroke of the pawl, when the stroke of the pawl is slightly more than the 90° movement desired for the disc. Thus by actuating the shaft 85 in the upward direction the pawl 93 is caused to actuate the disc 90 through a 45° turn or angle after which the disc 90 is rotated 45° more when the tripping device 75 is kicked around 45° by trigger 76, and by actuating the shaft 85 downwardly the pawl 94 actuates the disc 90 through 90°. A pin slot driving connection 86' is provided between the shaft 85 and the bell crank arm 86, as a suitable drive means accommodating itself to the arcuate movement of 86.

The brake 81 for the shaft 30 as above described is diagrammatically shown and is automatically set by its toggle activated by member 85 upon upward movement (Figs. 4 and 7E) to brake the shaft 30 when the shaft 52 is operated through rod 85 to bring the tripping device 77 to the position shown in Fig. 7C.

The brake 81 is schematically shown of a conventional type consisting of a brake band biased to release position. The operating means for the brake comprises a pair of toggle arms 106 pivotally mounted at 106' with a spring 107 fastened to the toggle arms 106 and adapted to retain the toggles either in release position or in the brake-operating position by being actuated to opposite sides of the pivotal axis 106'. The toggles 106 bear against the operating lugs 81' formed on the brake band 81 when the brake is on as shown in full lines in Fig. 7E. The dotted position of the toggles shows the brake released position. The dot-dash position shows an intermediate position in the act of opening or closing. The brake is set by the upward movement of the shaft 85 through a lever 108 pivotally fastened to the fixed part of the frame at 109' and having a pin slot driving connection 108' with the shaft 85. The lever 108 is provided with an operating finger 109 which during the upward movement of the shaft 85 moves about the pivotal center of the lever 108 in the arc of a circle to engage a projection 107' on one of the toggles 106 which is disposed in the path of the finger 109 when the toggles are in the brake released position. Thus by upward movement of the shaft 85 from its lowermost position the lever 108 engages the brake-setting toggles 106 to shift them from the dotted position shown in Fig. 7E far enough so that spring 107 automatically sets the brake to the full line position shown.

The brake continues to be applied until the trigger 76 of the speed governor kicks the tripping device 75 from the position shown in Fig. 7C to the position shown in Fig. 7D and when this happens the brake is automatically released by the brake tripper 100 mounted on shaft 52 and having diametrically opposite teeth or lugs 101 either of which when in the position corresponding to Fig. 7D is then in a position to engage and actuate a lug 102 on an oscillatory shaft 103 for releasing the brake. This shaft carries an arm 104 which is operatively connected with a bell crank lever 105 pivoted at 105' to a fixed part of the frame, this connection being in the form of a fork 104' straddling the arm 104. The other arm of the bell crank lever 105 is operatively connected with the brake toggles 106 through a pin slot connection 103'. In the full line position shown in Fig. 7E one of the brake tripper lugs 101 is shown in a position to engage and actuate the oscillatory shaft 103 when the tripper 75 is operated by the governor trigger 76 and the dotted line position of the parts indicates the positions immediately after the brake 81 has been released automatically by the speed governor. It is understood that the lever 108, and also the bell crank 105, is intended to move its corresponding toggle 106 far enough to carry the spring 107 past dead center so as to move the other toggle in the same direction, in accordance with the operation of such toggles generally.

The energization of the motor 41, 42 (Fig. 6A) and the complete process of arrest of rotation and locking of the wing 1 in a position transversely of the fuselage above described immediately follow the release of the brake 81 by the governor.

The next step in this conversion from rotary to fixed wing which follows immediately the locking of the wing against further rotation, is the levelling and locking of the wing against oscillating movements in a vertical plane about the axis 5 and holding it rigidly in this position while the plane is thus fixed for operation as a high speed fixed wing type plane. In the embodiment shown this is accomplished by means of the struts 6 and a cooperating mechanism to be described, the struts 6 being shown in dotted lines in Fig. 3 in position to clear the rotating wing and being shown in full lines in the vertical position wherein the convertible wing 1 is locked in the horizontal position against oscillation in a vertical plane.

The struts 6 are similarly constructed, mounted and operated and in Figs. 9 and 10 I have shown only one of these struts. Each strut is mounted at its lower end on the end of the lower permanently fixed wing 2 for movements between the dotted and full line positions shown in Figs. 3 and 9. In the particular embodiment shown this strut is mounted at its lower end for angular movement about a fore and aft axis 110 being the center of a shaft 112 mounted on the frame of the wing 2. An operating means for this strut in the particular embodiment shown includes a worm gear 111 which is fixed to the shaft 112 and this worm gear is operatively connected with the struts 6 through an elastic compressible and resilient block 113 mounted in a sector 114 formed in the worm gear 111. The strut 6 is not keyed to the shaft 112 but is provided with a projecting lug or arm 115 which extends into the sector opening 114 and between the lefthand edge of the resilient block 113 (looking at Fig. 10) and the lefthand end wall 114' of the sector opening. This resilient mount performs a function hereinafter described. The gear 111 may be actuated in any suitable manner, as for example, by a worm 116 meshing therewith and mounted on a shaft 117 driven in the particular embodiment shown by a sprocket 118 (all mounted on the frame of wing 2) about which runs a chain drive 119. Through the operation of the gear 111 the strut 6 may be operated from the vertical position to the inclined position or vice versa.

The upper end of the strut 6 is adapted to be rigidly fastened to the frame of the convertible wing 1 as indicated in the full line positions indicated in Figs. 3, 8, 9 and 10.

The underside of the convertible wing 1 is provided intermediate its fore and aft edges with a gradually increasing guide path 121 (Fig. 9) towards the wing tip, that is gradually increasing in depth in vertical plane. In a horizontal plane as shown in Fig. 9a this guide path gradually decreases in width towards the wing tip by the side converging walls 122. The outer end of this guide path 121 is bounded by a wing frame member 123. Attached to this frame member 123 is a block 124, this block being shown as mounted midway between the outerends of the side walls 122 of the guide path. The block is provided with a wedge-shaped recess 125, this wedge-shaped recess 125 having converging vertical walls 127 which merge into an extension 126 of this recess. The upper and lower walls 128 of the recess 125 are formed of sides converging to an edge 129. The upper wall of the guide path 121 is indicated at 121'. A slidable cover plate 130 is mounted for sliding movement inside the wing toward the guide path 121 for covering up the opening formed thereby when the upper end of the strut 6 is locked in position, the details of the mount for this sliding cover 130 being omitted for convenience in illustration.

The strut 6 is provided with suitable fairings 132 and the upper end of the strut frame is provided with a pair of rollers 133 for engaging the upper wall 121' of the guide path 121 so as to provide a frictionless engagement with said wall 121' when the strut is being moved to and from its vertical position. Rigidly mounted on the upper end of the strut frame is a wedge guide member 135 having upper and lower wedge-shaped surfaces 136 which engage the similarly shaped walls 128 of the block 124 for locking the upper end of the strut firmly in the vertical position. There is also mounted upon the upper end of the strut frame a wedge-shaped guide member 138 having its side walls 139 corresponding to the converging fore and aft walls 127 of the recess 125 formed in the block 124 and in the locked position, the upper end of the strut is thereby locked firmly to the block 124 in the fore and aft direction. To facilitate entry of the wedge-shaped locking member 138 into the recess 125 formed in the block 124 the locking member 138 is hinged for movements on a transverse axis near the upper end of the strut frame. In the particular embodiment shown this is effected by mounting in the fore and aft direction and at right angles to the strut frame a shaft or rod 140, this rod being rigidly fastened to the upper end of the strut in any suitable manner, the details of such fastening being omitted for convenience in illustration. The locking member 138 is hinged to this shaft or rod 140 by a pair of hinges 141 and a spring 142 is attached at one end to this hinged locking member 138 and at the other end to a fixed part of the upper end of the strut in a manner to yieldingly urge the member 138 in an upward direction with the outer end thereof projecting above the level of the rollers 133 when the strut occupies the dotted line position or the position where it is not in engagement with the convertible wing. This locking member 138 is provided with an opening or vertical recess 143 having converging sides 143' (Fig. 9A) for the purpose of clearing the wedge 135 in its pivotal movements about the axis 138' (shaft 140). There are two rollers 133, one on each end of a shaft 133'. The forward edge of the hinged locking member 138 is provided with a roller 145 and this roller, together with its mounting, is disposed in the extension 126 of the recess 125 formed in the block 124 when the strut is firmly locked in position.

The strut is firmly locked against accidental movement about the axis 110 by means of a pivot latch member 146 which is pivoted at 147 to the strut 6 at a point intermediate its ends and in a position adjacent the lower edge of the block 124 so that the latch end 146' may enter a recess 148 formed in the under side of the block 124. This latching member 146 is firmly held in the locking position by being operatively connected with and held by the worm gear member 111 when the latter occupies the final locking position of the wing. These operative connections include a pair of cables 149 and 150 which are connected at their upper ends respectively to the ends of the latch member 146 and at their lower ends are connected to the gear 111 at spaced points 151 adjacent the peripheries of the gear 111. These cables cross each other as shown in Figs. 9 and 10 and operate in tension, for example, in the latched position the cable 150 is under tension while in the unlatched position the cable 149 is under tension. The strut 6 may be provided with a suitable brace member 153 which is at its upper end pivotally attached to the strut with its lowermost end sliding on a track formed in the lower wing (omitted for convenience in illustration). The lower end of this brace may be flexibly connected with the chain 119 so as to enable the chain when operated to apply an operating force to the strut 6 in addition to the force applied through the gear 111.

The operation of locking the convertible wing in its fixed position against oscillations about its axis 5 (Fig. 3) is as follows: Assuming the strut 6 is in the dotted position shown in Fig. 9, the chain 19 is operated in a direction to turn the gear 111 counter-clockwise (Figs. 9 and 10). The strut 6 is thereby turned counter-clockwise about the axis 110 (being freely mounted on the shaft 112 except for the lug 115 connection with the gear 111) and as the upper end reaches the undersurface of the convertible wing the roller 145 on the hinged locking member 138 engages a lug or finger 131 (Fig. 9B) on the closing gate 130, and moves the latter toward the left (Fig. 9) and slides it over in a position to synchronize its opening 130' with the top of the entering strut and then close the guide path 121 formed underneath the wing, this gate or slide having said synchronized opening therein to accommodate the shaft 140 and the rollers 133, the latter following the upper surface 121' of the gate path. The opening 130' in this gate or slide is also of sufficient dimension to accommodate the hinged locking member 138, the latter being urged downwardly against the tension of the spring 142. This 142 is a spiral spring, acting about the axis 140 to urge 138 to its stop. The movement of the strut continues until it reaches the locking position shown in Fig. 10. In this locking position the latch 146 occupies the position shown in dotted lines in Fig. 10. The strut 6 is now in its vertical locking position in which it is maintained and is then latched in this position by a further rotation of the gear 111. The partial rotation of this gear required for latching the member 146 into the recess 148 is indicated by the sector between the lug 115 and the lefthand wall 114' of the opening 114, the resilient block 113 being now compressed between the arm 115 and the right-hand wall of the opening 114 formed in the gear 111.

The first step in the reverse operation, namely of unlocking the strut 6 and moving it to the dotted position shown in Fig. 9, when converting from a fixed wing to a rotary wing craft, is the partial clockwise rotation of the gear 111 sufficient to unlatch the latch member 146 from the block 124. The continued movement of the gear 111 in the clockwise direction by the chain 119 then moves the strut 6 to the position shown in dotted lines in Fig. 9 and during this movement the gate or slide 130 shown in plan in Fig. 9B is moved to the right by the upper end of strut 6 and roller 145 contacting lug or finger 131' to occupy a position to the right of the gate path 121 as shown in Fig. 9. The rollers 133 and 145 provides for frictionless movement in all positions.

The approximate halves or blades of the convertible wing 1 are journaled about axes longitudinally of the wing halves for variation in pitch. In the particular embodiment shown the pitch adjustment axes are disposed forward of the center line of the wing halves in the direction of rotation but they may be centrally or otherwise located. In the embodiment the right blade (Fig. 1) is journaled about an axis 160 slightly moved forward of its central line and the other wing half is journaled about an axis 161 disposed forwardly of its central line in the direction of rotation.

The means for varying the pitch of the wing halves about the axes 160 and 161 comprises an adjustable floating ring 162 (Fig. 12) which is connected at diametrically opposite points by brackets or arms 163 (Fig. 13) having universal connections 164 with the lower ends of links 165. The upper ends of these links 165 are in turn suspended from the ends of a pair of levers 166 pivotally mounted intermediate their ends on the pivotal axes 167 on fixed parts or brackets 168 of the wing frame. The other ends of these levers 166 are connected by universal connections 169 with links 170 which are connected with the frameworks 1' of the wing halves by similar universal connections 171. The hookup between the floating ring 162 and the wing half frames 1' is shown diagrammatically in Fig. 1.

The floating ring 162 surrounds the axis of the drive shaft 30 and within this drive shaft 30 is fixedly mounted a tubular guide 175 which at its upper end forms a guide for a vertically movable ring 176, suitable ball bearings 177 being provided between the upper end of the guide tube 175 and the inner raceway or raceways formed on the inner surface of the ring 176. This ring 176 is carried and supported by a vertical operating rod 178, this rod having at its upper end several outwardly radiating arms 179 which are fixedly attached to the ring 176 so as to move it bodily up and down. The upper end of the guide tube 175 is provided with openings 180 therein to accommodate the arms 179. By actuating the control rod 178 longitudinally the control ring 176 is moved up and down to actuate the wing halves through equal pitch angles for vertical lift when the craft is operating as a helicopter.

Intermediate the floating ring 162 and the inner ring 176 are disposed a pair of rings 181 and 182. The ring 181 is mounted for oscillation about the axis C—D (Fig. 12) for angular adjustments about the ring 176, the axis C—D passing through diametrically opposite points of the ring 176. The ring 182 in turn is mounted for oscillation about an axis E—F passing diametrically through the opposite points of the ring 181, this axis E—F being at right angles to the axis C—D. The ring 182 is journaled to the floating ring 162 by means of a ball bearing and ball bearing race shown at 183. The adjustment of the rings 181 and 182 about the axes C—D and E—F is effected respectively by the vertical rods 186 and 185, these rods having outwardly turned arms 186' and 185' which pass through openings formed in the side of the guide 175 and being connected by links 187 and 188 for operation of their respective rings. Thus by actuating the rods or arms 179 and 185 and 186 the rotary wing 1 may be controlled both for vertical lift and periodic control. By vertical lift control is meant the actuation of the rotary wing halves about the respective axes 160 and 161 through equal angles for controlling the lift. The periodic control is the control superposed on the equal control whereby the adjustments of the individual wing halves may be varied at any particular point or points in the revolution. Both controls are used during helicopter operation and only the periodic controls are used during autorotating operation.

These rods or arms may be actuated in any convenient manner but in the particular embodiment shown they are operated by a single control member 190 (Fig. 15). This member 190 is universally connected at 191 with a vertically adjustable screw member 192 for angular movements thereabout, the latter being screw-threadedly attached to a fixed member 193 of the craft as by means of the screw threads 192' engaging corresponding screw threads on the interior of the sleeve 193' formed on the frame member 193. In the particular embodiment shown the screw threads are screw members 194 projecting through the sleeve 193' and engaging the screw threads 192'. By this means the single control member 190 may be moved longitudinally of itself in either direction by simply rotating the member 190 and thereby rotating the screw member 192. A wheel 195 is illustrated for rotating and angularly moving the control member 190. The universal connection 191 permits the member 190 to be swung in any direction with reference to the member 192. The control member 190 and its movements are utilized for supporting and actuating the control rods 178, 185 and 186, and any suitable means or connections may be provided for the manipulation of the control rods 178, 185 and 186 from the universally movable member 190.

I have illustrated somewhat schematically a means for this purpose in Figs. 14 and 15. This diagrammatically shown means comprises a lever member 196 which is fulcrumed at 197 to a bracket 198 which is journaled to a slide 199 guided by guideways 200 disposed generally in a direction parallel to the lever 196, the guideway 200 being fixed against movement. The lever 196 is operatively connected at its lefthand end with the control member 190 through a universal connection 201 which enables the control member 190 to apply movements to the lever 196 in the direction of the length of the control member 190 by the screw threaded adjustment above described or to impart movements to the lever 196 in the direction of its length by moving about the universal joint 191 or movements about the axis of the rotary bracket 198. The movement of the control member through the screw-threaded adjusting means 192', 194 results in the movement of the lever 196 in the plane of the control member 190 and about the fulcrum 197 and this moves the rod 178 longitudinally of itself to control the vertical positions of the ring unit (rings 176, 181, 182 and 162). This, as indicated above, imparts generally equal changes in pitch to the two wing halves.

The lever 196 is operatively connected with the actuating rod 185 by means of a bell crank 203 having one end universally connected at 204 with the lever 196 and having its other end connected by universal connection 205 with a link 206 which is operatively connected with the lower end of the rod 185. The bell crank 203 is pivotally attached to a bracket member 207 journaled for rotation in a slide 208 which is guided by the fixed guideway 209, this fixed guideway 209 being disposed at right angles to the fixed guideway 200, thereby permitting movements of the slide 208 longitudinally of the guide 209 to prevent movements of the slide 208 at right angles to the guide 209. This enables the control of the rod 185 if desired independently of any material movement of the rod 178 (or the rod 186), as for example by swinging the control member 190 about the universal joint 191 in the plane of the drawing. The slide 199 moves in the guideway 200, without materially or substantially moving the rod 178 longitudinally of itself, to actuate the bell crank 203 either up or down to actuate the actuating rod 185. For permitting movements of the lever 196 longitudinally of itself and in the plane of the lever about the bracket axis 198 without materially actuating the rod 178 longitudinally of itself, I have illustrated an operating link 178' which is universally connected at one end to the rod 178 and at the other end by means of a similar universal connection with the lever 196, this link 178' being in all positions of the lever 196 sufficiently in line with the rod 178 to enable operation thereof by the up-and-down movements of the lever about the pivot 197.

Similarly, the lever 196 is operatively connected with the rod 186, as for example by an L-shaped arm 211 rigidly fastened at one end to the lever 196 and having at its other end a universal connection 212 with a bell crank lever 213 with the other arm of this bell crank lever being connected by a universal joint 214 with a link 215 which is pivotally connected with the lower end of the actuating rod 186. This bell crank 213 is pivotally attached at 216 to a bracket 217 journaled in a slide 218 which is guided by a fixed guide 219, this guide being fixed against movement. When for example the control member 190 is actuated at right angles to the lever 196 to turn about the universal joint 191, the lever 196 thereby pivoting about the bracket axis 198 to actuate through the arm 211 the bell crank 213 thereby actuating the rod 186 longitudinally of itself. This movement of the righthand end of the lever 196 (Fig. 15) to actuate the rod 186 longitudinally of itself does not materially move the rod 178 since the lever 196 moves at right angles to the latter and this same movement does not materially actuate the rod 185 because the movement of the righthand end of lever 196 is at right angles to the bell crank lever 203.

The pivoting movements in vertical planes of the lever 196 about its fulcrum 197 as above indicated move the operating rods 178, 185 and 186, and the rings as a unit so that if it is desired to change the angles of incidence of the wing halves equally without affecting the periodic control this may be effected by the longitudinal movement of the control member 190. In order to obtain a simultaneous shift of either of the periodic control rods 185 and 186 a corresponding swinging movement of 190 about its universal 191 would need to be imparted with its longitudinal movement. The guide paths 209 and 219 are disposed generally at right angles to the lever 196 and therefore parallel to each other, whereby upon up-and-down movements of the lever 196 not only the rod 178 is actuated but the rods 185 and 186 are also actuated through a substantially equal amount. These movements are imparted to the rods 185 and 186 through the bell cranks 203 and 213 respectively with the slides 208 and 218 moving longitudinally of the guide paths. This simultaneous and equal actuation of the rods 185 and 186 with the actuation of rod 178 is effected notwithstanding the angular positions of the bell cranks 203 and 213 about their pivotal connecttions with the swivel brackets since the actuating force is generally longitudinal of the long arms 203 and 213 of the bell cranks and their pivotal points, with no substantial force applied at right angles to these arms when the lever 196 is moved up and down. The maximum angular movements of the bell cranks 203 and 213 and the guides for the slides 208 and 218 are so arranged as to operate the ring structure as a unit in all angular positions of the bell cranks 203 and 213 and as above indicated the drawings are purposely diagrammatic. The rods 178, 185 and 186 are thus operated as a unit by movement of the control member 190 longitudinally of itself. The rod 185 may be independently actuated by swinging the control member 190 in the plane of the drawing, and the rod 186 may be independently operated by swinging the member 190 at right angles to the drawing. Both actuating rods 185 and 186 may be simultaneously operated independently of the rod 178 to differentially adjust the pitch of the wing halves by simply moving the control member 190 about its universal joint 191 in planes between the above described plane movements.

Thus, the controls for varying the angles of incidence of the wing halves of the rotor wing 1 comprise a means (control shaft 178) for varying the angles of incidence of the two wing halves equally and also the control means (control rods 185 and 186) for periodically varying the angles of incidence of the two wing halves at different positions in their angular rotation. The operation of the rod 185 is effected by moving the lever 196 longitudinally of itself and this is mainly for diving and climbing. The movement of the control rod 186 is effected by swinging the lever 196 about its swivel at the fulcrum point 198 in horizontal planes whereby the machine may be banked one way or the other, and by a combination of longitudinal and swinging movements of the lever 196 these different controls may be effected simultaneously, and similarly with respect to the longitudinal movement of the control member 190 for moving the control rod 178.

All of these controls are desirable in helicopter operation but only the periodic controls are desirable in gyro operation or possibly in airplane operation where these blade differential movements are used instead of, or auxiliary to, aileron movements. I have therefore provided means for neutralizing the control effected by the rod or shaft 178 in going from helicopter operation to gyro operation and for re-establishing this control in going from gyro to helicopter operation. Referring to Fig. 15 this means comprises a yielding screw threaded attachment between the upper end of the control stick 190 and the fixed bracket 193. For this purpose spirally arranged spring pressed plungers 194 carried by the cylindrical sleeve 193' are provided for cooperating with the screw threaded end 192' of the member 192 whereby the control member 190 may be pulled downwardly to slip the screw threaded end 192' through the spring pressed plungers 194 when it is desired to neutralize the lift controls or controls effected by the rod 178. The upper end of the control stick is provided with a central extension 285 passing through a web part 286 of the frame member 193 and being provided with an enlarged end 285' for engaging the web 286 and retaining the control member 190, 192 in operative position for swinging movements about the universal joint 191 and actuating the controls 185 and 186. If desired the neutralization and alinement of the wing halves may be effected by rotating the wheel 195, namely by lowering the control member 190 until the end 285' of the extension 285 rest upon the supporting web 286 of the bracket 193. An arrangement whereby the screw-threaded upper end may be slipped downwardly to the lower limit of the control member by applying sufficient force to slip past the spring-pressed plungers 194 enables a quick neutralization and alinement of the wing halves.

The lowermost position of the control member 190, namely with the member 285' resting upon the web 286 corresponds to the neutral position of the control rod 178, which means that if the control rods 185 and 186 are in neutral position the rotary wing halves are alined with each other to have the same angle of incidence. The control member 190 is still screw-threadedly attached at its upper end to the lowermost spring-pressed screw threads 194 so upon converting from gyro to helicopter operation the control member 190 may be rotated to vary the angles of incidence of the wing halves equally for helicopter vertical operation. It is understood that the pull exerted on the rod 178 by the aerodynamic forces on the wing halves during their rotation is not sufficient in itself to slip the screw-threaded end 192' of the control stick through the spirally arranged spring holding plungers 194.

In Fig. 15 I have illustrated a power control for the power plant whereby the throttle or power control of the power plant may be operated by the control member 150 or may be conveniently operated by the pilot. This control is indicated diagrammatically at 225 and is mounted on the lower end of the control member 190. It comprises a cross arm 226 with control rods or cables 227 connected with the ends of the cross arm, which rods or cables lead to the throttle or other power control. An operating handle 228 is disposed in the lower end of the member 190 and is fastened to the cross arm and by the rotation of this handle 228 the operating connections 227 may be actuated to control the power plant. In the particular embodiment shown the cross arm traverses slots 226' formed diametrically on the opposite sides of the hollow member 190, these slots being of sufficient arcuate length to enable the cross arm to be turned through the required angle to effect operation of the throttle or power control. This control is thus mounted conveniently to the control wheel 195 whereby the control is facilitated. In some cases it may be advantageous to have the power control actuated by the control member 190 so as to vary the power plant in coordination with the changes in the angle of incidence or pitch of the rotating wing halves, as, for example, at predetermined points in the rotation of the member 190. Thus the arrangement of the slots 226' with respect to the cross arm may be such as to effect actuation of the controls 227 by the engagement of the ends of the slots 226' with the cross arm at a predetermined point in the relative angular positions of the member 190 and the cross arm 226. The controls for the power plant do not form any part of the invention and are omitted for convenience and simplicity in illustration. The arrangement is such that the ordinary universal movements of the member 190 about the universal joint 191 in effecting the periodic controls does not actuate the throttle or power control of the power plant and for this purpose the rods or connections 227 may be provided with elastic or spring sections.

The traction propeller (Fig. 1 in the embodiment shown) is of any suitable type of controllable pitch propeller although a fixed pitch propeller could be arranged for, and it is deemed unnecessary to illustrate such conventional structures. It may be desirable to control its pitch during conversion as, for example, when going from fixed plane operation to gyro operation or from gyro operation to plane operation, or from gyro operation to helicopter operation, or from helicopter operation to gyro operation. For this purpose I have illustrated in Fig. 7E a control indicated diagrammatically at 270 for controlling the pitch of the propeller 10 and it is understood that this means 270 may be actuated at any one or more points of the conversion range to vary the propeller pitch. This means 270 is illustrated as being pivotally attached to a forked member 271 pivoted at 272 to the frame and this fork may be actuated in any suitable manner, as for example through the means diagrammatically illustrated from the control shaft 85. A bell crank lever 273 is pivoted at 274 and one arm of this bell crank lever 273 has a pin slot driving connection 275 with the shaft 85. The other arm of the bell crank 273 is pivotally connected to a connecting link or arm 276 whose opposite end is pivotally connected to a lever 277 which is pivotally fastened to the frame at 278 with the free end of the lever 277 projecting down in between the forks of the forked member 271. By this means the reciprocating movements of the shaft 85 operate the pitch adjusting means 270 at certain points in the travel of the shaft to vary the pitch of the propeller. If the pitch is to be varied in going from helicopter to gyro it may be desirable to increase the pitch of the traction propeller 10 in that case and to decrease it in going from gyro operation to helicopter operation.

It is also desirable to apply the power of the driving engine to the helicopter wing in converting from gyro to helicopter operation and to disconnect the power when converting from helicopter to gyro. For this purpose a clutch 35' (Fig. 4) is provided in the shaft drive 35 between the engine (not illustrated) and the shaft 30. This clutch 35' is diagrammatically illustrated for convenience in illustration and comprises a movable part 279 (Fig. 4) which is operated in suitable manner. For example, this clutch as diagrammatically shown may be operated by the pitch control means 270 of Fig. 7E. The means 270 may be utilized to control both the pitch of the traction propeller 10 and the clutch 35' when the pitch control is to effected at the change-over between gyro and helicopter operations.

In Fig. 1 I have shown diagrammatically at 240 an anti-torque motor. This may be of any reaction type wherein the issuance of the explosive or burning charges through a laterally disposed nozzle 240' sets up a force opposed to the twisting torque on the fuselage. The explosive or burning charges may be formed in any suitable manner and by any suitable means, and it is understood that the following diagrammatically described means are intended to apply to any type of reaction motor, jet or explosion for causing the burning or explosive charges to be discharged laterally of the fuselage so as to counteract the torque of the driven wing 1. I have shown diagrammatically a means for starting, stopping and controlling the motor 240. This means is actuated by a control means 246 (Fig. 17) which is actuated by the longitudinal movements of the shaft 85. For this purpose the control member 246 is actuated by a bell crank 247 pivotally fastened at 248 to one end of a lever 249 pivoted at 250 to a fixed part 251 of the frame. The end of the lever on the opposite side of the pivot point 250 from the bell crank 247 is fastened by a universal connection 252 to an adjusting screw 253 screw-threadedly attached to a fixed part 254 of the frame and a handle 253' is carried by the adjusting screw 253 for adjusting the lever 249 about the pivot point 250. The up-and-down adjustment of the adjusting screw member 253 results in similar up-and-down movements of the pivotal point 248 of the bell crank 247 but in the opposite directions. One arm of the bell crank 247 is connected with the shaft 85 by means of a pin slot drive 255 and the other arm of the bell crank 247 is operatively connected with an angular part 246' of the member 246 by means of a pin slot connection 256. Thus the jet motor control member 246 may be actuated either by the up-and-down movements of the shaft 85 with the lever 249 fixed, or it may be operated by moving the lever 249 when the shaft 85 is fixed.

Referring to the diagrammatic control for the jet combustion motor 240 (Fig. 1), fuel may be delivered through a supply line 257 and air or oxygen, or a mixture of the two may be supplied through the supply line 258 with valves 257' and 258' controlling these supply lines. An ignition means, such for example as an electric spark plug 260' is indicated and supplied by ignition current controlled by a switch 260 which forms one part of a bell crank lever. The switch bell crank lever 260 and the valves 257' and 258' are diagrammatically illustrated as being controlled by the means 259 operatively connected with the control means 246 shown in Fig. 17.

In the present embodiment, in Figs. 1 and 23 I have illustrated diagrammatically a means for controlling the power of the jet motor 240 automatically responsive to the mechanical changes of the angles of incidence of the wing-halves or blades although other methods of such automatic control can be installed without departing from my invention. There are diagrammatically shown valves 261 and 262 (Fig. 1) in the fuel and air supply lines for regulating the fuel charges supplied to the jet motor 240 and means are provided for controlling the positions of these valves 261 and 262 responsively to the angles of incidence of the wing halves of the helicopter wing. This latter means comprises a bell crank lever 263 (Fig. 23) pivoted at 264 to a fixed part of the frame of the center section 25 of the wing and one arm of this bell crank lever 263 has a pin slot driving connection 265 with one-half of the wing 1 to move this arm of the bell crank lever responsively to the angle of incidence. The other arm of the bell crank lever is connected through a pivot link 266 with another bell crank lever 267 with one arm of the latter being connected through the operating line 268 with the control valves 261 and 262. Generally speaking, the torque varies in proportion to the angle of incidence of the wing half and accordingly with the means shown the controls 261 and 262 may be arranged to vary the power of the jet anti-torque motor 240 generally with the variation in torque of the driving motor which is applied to the shaft 30 through the clutch 35'. This automatic torque reaction control is independent of manual control of the same previously described. Instead of the control generally described, the laterally disposed nozzle 240' may be adjustably mounted to assume varying angles to the fore and aft axis of the fuselage so as to vary the anti-torque force and this may be effected automatically or responsively to the torque of the wing driving motor as, for example, responsively to the angles of incidence of the wing halves (Fig. 23).

Any suitable means may be provided for cushioning and limiting the oscillating movements of the rotor-wing on conversion between fixed wing operation and rotary wing operation. I have shown in Fig. 21 somewhat diagrammatically a means for cushioning and limiting the oscillations under these conditions. The particular means shown comprises leaf springs 280 which are rigidly fastened at their outer ends to the wing half frames with their inner ends fastened to or operatively in engagement with the central frame structure of the non-oscillating part 25. This frame is provided with sockets 281 disposed at right angles to the pivotal axis 5 and the inner ends of the leaf springs 280 and 280' are received in these sockets 281 and 281'. Preferably the inner ends of the springs 280 and 280' are not rigidly fastened to the central frame but are provided with room in the sockets 281 and 281' for free and unhampered oscillated movements within certain limits and when the wing halves oscillate through angles past these limits the inner ends of the springs engage the walls of the sockets 281 and 281' to cause the springs 280 and 280' yieldingly to oppose further angular movements for resisting the excessive oscillations. Hydraulic or pneumatic means may be provided for accomplishing the same purpose.

I have described above how the rotary wing may be converted from a fixed wing type of craft to a rotary wing type and vice versa and from a gyro to helicopter and vice versa. These conversions may be readily and safely effected while the craft is in the air. For example, the plane may take off as a rotary wing type of plane and then be converted in the air to a fixed wing type of plane and reconverted while still in the air back to a rotary wing craft, either gyro or helicopter. The craft therefore embodies the advantages of a rotary wing type of plane for convenience and safety in ascending and descending whenever desired and also the advantages of high speed efficient plane operation as a fixed wing craft.

The converting and control means may be actuated and manipulated in any suitable manner and by any suitable means and manner. In Figs. 17, 17A, 17B and 18, I have shown an effective and simple unified control means whereby the pilot may quickly and by moving one lever convert from one type of flight to the other with safety while in the air. This unified means comprises a lever L pivotally mounted at a fixed part of the craft as indicated at M. The lever L by moving through an angle of 135° effects a complete conversion from one type of plane to the other. It is operatively connected with the control shaft 85 through the pin slot connection 230 whereby the shaft 85 is moved longitudinally of itself to actuate the controls necessary for conversion as described above. The chain 119 which actuates the struts 6 during conversion is driven by a sprocket 231 mounted on a shaft 232 which in turn is driven by a shaft 233 through sprocket wheels 233' and 232' respectively carried by the shafts 233 and 232 and a chain 234 running about these sprockets. The shaft 233 in turn is actuated by a stub shaft 235 through a small gear 236 on the shaft 233 and a larger gear 237 on the stub shaft 235. The stub shaft 235 carries a bevel gear 238 and this shaft 235 and bevel 238 for diagrammatic purposes are shown to be intermittently driven by a mutilated bevel 239 which is actuated directly by the lever L to actuate the chain 119 during that part of the movement of the lever L wherein the struts 6 are to be angularly actuated about their pivot points.

When the machine is operating as a fixed wing plane, lever L is in the low extreme position at the end of its 135° travel as shown in dotted lines (Fig. 17) and when the machine is operating as a helicopter the lever L is in its upper extreme position at the other end of its travel, as shown in full lines. Intermediate these extreme positions of the lever L the machine operates as the autorotative auto-gyro (called gyro) condition of flight with the wing being driven by the air. The legends indicated in Fig. 17 show the positions of lever L for the different types of operation.

In converting from helicopter to gyro operation the control member 190 may be moved downwardly to its lowermost position to neutralize the control rod 178 (Fig. 15) by either rotating the wheel 195 to bring it down to the neutral position through means of the screw-threaded adjustment provided at the upper end, or it may be instantly brought down to the lowermost position by slipping the upper threaded end of the control member 190 downwardly past the spring threads 194. This instantaneous movement may be effected by manually engaging the wheel 195 and pulling the member 190 downwardly but in Fig. 19 I have diagrammatically illustrated a means operating in unison with the lever L and the control shaft 85 for instantly neutralizing the control 178 upon conversion from helicopter operation to gyro operation and maintaining this control neutralized by the friction of the spring thread until re-conversion to helicopter operation takes place.

Referring to Figs. 15 and 19, this means comprises operative connections between the control shaft 85 and the control member 190, 190'. A lever 295 is pivotally fastened at 296 to a vertical frame member 297, the latter being fixed at its upper end to a fixed part of the frame 298 and at its lower end to the guide frame 200. This lever 295 is provided with a fork 301 straddling the shaft 190' and engaging on its under side the collar 302 on 190' for pulling the control member 190' to its lowest position upon conversion from a helicopter. A spring 299 fastened to the frame 298 at one end and to the lever 295 biases the fork 301 away from the collar 302. The other end of the lever 295 projects into the path of an actuator 300 carried by the member 85 whereby at the initial upward movement of 85 the righthand of lever 295 is operated to neutralize the vertical lift control. This lever 295 therefore presses down through the fork 301 on the control member 190 at the initial upward movement of 85 to slip the screw-threaded end through the yielding threads 194 and thereby to elevate the control shaft 178 to its upper position to neutralize the equal angle of incidence control effected thereby.

The dotted position of 300 indicates the lowest position of the control member 85 and the full line position shows the mechanism after the neutralization of the lift control. In order to avoid fouling of the actuator 300 by the lever 295 during conversion to a helicopter the actuator is movably mounted on an arm 300' which is rigidly secured to the control member 85 so as to clear the lever upon downward movement. For this purpose the actuator 300 is provided with an inclined surface 400 on its free end facing downwardly and is slidably fastened to 300' so as to enable the lever 295 to impart to 300 the clearing movement. The arm 300' is provided with a guide flange 401 disposed in a chamber 402 formed in 300 and the latter is biased outwardly by a spring 403 engaging at one end the flange 401 and at the other end the wall at the end of chamber 403.

If it is desired to convert to fixed wing operation it is then desirable to neutralize the control rods 185 and 186. This may be effected in any suitable manner. This is effected as shown in Fig. 19 as follows: In addition to the upward movement of the shaft 85 for converting from helicopter operation to gyro operation as described above, it is necessary to impart to the shaft 85 further upward movement beyond that necessary to convert to gyro and this further upward movement effects neutralization of the gyro controls. This neutralization means comprises an arm 290 projecting out from the shaft 85 and engaging the end of the lever 196 when the shaft 85 is given the further upward movement to convert to fixed plane operation. The under side of the lever 196 is provided with a female conical shaped socket member 292 and the arm 290 is provided with a correspondingly conical shaped male member 291, and when these parts 291 and 292 are mated together the periodic controls are neutralized. The proportions and arrangement are such that in all positions of the lever 196 the pointed end of the male member 291 registers with the outer and widest end of the conical female recess or socket 292 though the two are out of alinement. Accordingly when the arm 290 is moved upwardly the conical shaped male member 291 by means of the conical cam surfaces on the members bring the female member 292 into axial alinement with 291 in which position the control rods 185 and 186 are neutralized and the wing halves are alined with each other with no differential in angle of incidence. The arm 290 is not rigidly attached to the shaft but is yieldingly fixed thereto by means of the coil spring 293 having one end engaging the slidably mounted arm 290 and its other end engaging a collar 294 fixed to the shaft 85. Thus when the shaft is given this further movement to convert from gyro to fixed plane operation the spring 293 holds the controls 185 and 186 in the neutral position ready for arresting the rotation of the rotary wing and locking it in fixed wing position. The arm 290 moves up in a fixed plane or path so as to impart to the lever 196 a centralizing movement for neutralizing the periodic controls.

Also in Fig. 19 I have illustrated a dual control for operating both the rotary wing controls and the airplane controls with means for disengaging the rotor controls when the craft is operating as a fixed wing craft. This mechanism is shown diagrammatically and comprises a means for supporting the dual control. This means comprises an elongated frame member 305, 305' which is fastened at one end to the vertical frame member 297 and is provided with a pivotal connection 306 at 305' for pivotal movement in a vertical plane. Intermediate its ends this frame member 305 is supported by the control member 190' which is mounted only for movements longitudinally of itself and rotary movements. This supporting means is schematically illustrated as comprising a collar 405 on 190' upon which 305 rests, and in the embodiment shown an arm 406 fixed to 305 is disposed on the opposite side of 190' and retains 305 on the collar 405. A collar 405' may be provided above 305 and on 190'.

The outer or lefthand end of the frame member 305 is provided with a yoke member 307 having a pair of downwardly extending supports 308 and these supports 308 carry at their lower ends a U-shaped yoke member 309 having hand wheels 310 fastened to the ends of the legs of the U member. The arms 308 are provided intermediate their lengths with universal connections 311 which permit the free universal swinging movements of the yoke 309 when either of the wheels 310 is engaged to move the yoke in any direction about these universal joints. By this swinging movement of the yoke 309 the ailerons 15 and the elevator 16 of the fixed wing 2 of the craft are manipulated to control the craft, when the latter is operating as a fixed wing craft, the aileron connections being diagrammaically shown at 312 and the elevator control being diagrammatically shown at 313. The rudder control is omitted for convenience and it may be of any conventional construction.

The yoke 309 may also be coupled up to the lever 196 to operate the rotor controls 185 and 186 when the machine is operating as a rotary wing. For this purpose the frame member 305 is provided with a downwardly depending arm 315 having a universal connection 316 at its upper end and to provide for universal swinging movements of the arm. This arm 315 has fastened thereof a pair of L-shaped coupling members 317 with an arm of each of the L members being universally connected with the downwardly depending arm 315 at 318. This universal joint is schematically shown in Fig. 20. The other arms of the L members 317 are each provided with a conical-shaped male coupling member 319 which cooperatively functions with a member 320 on the yoke 309 having a conical female recess for receiving the male coupling parts 319 so as to couple the coupling elements 317 to the yoke 309 for swinging movements in unison. When the coupling elements 317 are in the dot-and-dash line shown in Fig. 19, the parts are coupled together for swinging in unison for actuating the rotor controls 185 and 186 by means of the dual control wheels 310. The coupling members 317 are shifted between the coupled and uncoupled positions by means of a lever 321 pivotally mounted at 322 on the frame member 297 as a fulcrum point. One end of the lever 321 is provided with a fork 323 straddling the shaft 85 and this fork is actuated by a spring 324 diagrammatically shown as surrounding the shaft 85 with one end engaging the collar 323' sliding on the shaft 85 and fixed to the under side of the fork 323 while the other end of the spring 324 engages a collar 325 fixed to the shaft 85. The other end of the lever 321 is bifurcated to form spaced extensions 326 having forks straddling the coupling elements 317 on the opposite sides of the universal connection 318. Thus by moving the shaft 85 upwardly the lever 321 moves the coupling elements 317 downwardly to disengage the yoke 309 from the rotor controls which corresponds to fixed plane operation. The coupling elements 317 are in the form of a toggle with a spring 328 fastened at its ends to the coupling members 317 and this spring holds the coupling members 317 firmly in either of their operative positions, the spring being below the universal connection 318 when the yoke 309 is uncoupled from the rotor control and being above the universal connection 318 when the yoke is coupled. One end of the lever 196 is coupled to the lower end of the downwardly depending member 315 by means of a universal connection 330, and by swinging the yoke 309 in horizontal planes the lever 196 is likewise operated in horizontal planes to operate the control rods 185 and 186.

The universal movements provided at 318 for the L members 317 is only a limited one to avoid binding and is insufficient to interfere with the coupling engagement between the male and female members 319 and 320 in conversion from fixed plane to gyro.

Reverse conversion is effected by downward movement of control member 85 from fixed plane position to release the periodic controls 185—186 at 291—292 and to couple the yoke 309 to the universally suspended member 315 and thereby to the lever 196. This coupling is effected by the spring 324 surrounding the member 85 pulling downwardly on the collar 323' fixed to the fork 323 to actuate the lever 321 and thereby the coupling members 317 to the dot-dash line position, the spring 324 being attached at its upper end to the collar 323' and at its lower end to the collar 325 fixed to the control member 85.

With the vertical lift controls neutralized, the machine is now operating as an auto rotating wing craft, the release and starting of the wing having been effected as above described. Through the manipulation of the yoke 309 about the universal joints 311 and 316 the periodic controls may be operated.

Conversion to helicopter operation is effected by further downward movement of control member 85 as above described, and as applied to the modification of Fig. 19 by rotating wheel 195 and shaft 190' which through the coupler 306—405 bodily lifts vertically the frame 305, the yoke 309 and suspending member 315 and the lefthand end of lever 196 to operate the control shaft 178 and restore the vertical lift control. The variation of the lift control is similarly effected.

Thus in fixed wing operation the yoke 309 may be universally actuated to actuate the ailerons and elevator and by means of the same yoke the rotor controls may be operated during rotary wing operation. The simultaneous operation of the ailerons and elevator of the fixed wing during rotary operation is not harmful and may in certain cases be helpful in rotary operation. During fixed wing operation it is understood that there is sufficient clearance between the yoke 309 and the coupler 317 and the other parts of the structure of Fig. 19 to enable full range of control movements of 309 without fouling.

Upon desire to change from plane flight to helicopter flight lever L is moved about its axis M from the dotted or broken-line position shown upwardly to the full-line position. During the change from the plane to gyro and to helicopter, the following sequence of operations takes place: During the first 5° movement from the broken-line position of the lever L (marked C in Fig. 17) the mutilated gear 239 operates through the connections above described the sprocket 231 and the chain 119 to release the latch 146 from the wing frame (block 124) thereby permitting the rotation of the struts 6 clockwise (Figs. 9 and 10). During the next 65° upward movement of lever L the struts 6 are actuated to the dotted positions shown in Figs. 3 and 9.

After the struts 6 are moved to their dotted positions shown so as to clear the wing when it begins rotating, further movement of the lever L results in lifting the locking pawl 46 and thereby releasing the pulley 40 enabling the motor 41, 42, 43 to start the wing rotating for flight as a gyro. This releasing of the pulley and wing for rotation is effected by the upward movement of the shaft 85 and the mechanism shown in Figs. 4 and 7E for actuating the trigger cam 75 which lifts the pawl 46 (Figs. 5 and 7).

After the release of the wing and the starting of the same for auto-rotation by the starting motor, the further upward movement of the lever L to the end of its travel, necessary for conversion to a helicopter, simultaneously starts the tail anti-torque jet motor 240 (Fig. 1) changes, for example, reduces pitch in the traction propeller 10, throws in rotor clutch 35' coupling the shaft 35 to the driving engine, and releases the vertical or total rotor control (178). The machine now is operating as a helicopter with the lever L in its extreme upward position, as shown in full lines. The gyro condition of flight is indicated as taking place roughly when the lever L has been moved through 115° as shown in the dotted or broken-line marked "gyro" in Fig. 17.

Upon desire to convert from helicopter operation to gyro operation, the lever L is moved downwardly 50°. The lever L is automatically locked in this position by means of the spring-pressed latch 241 carried by the lever L entering a notch 243 formed in a fixed quadrant 242. To release this lever the pilot presses on the release handle 243 so as to release the plunger 241 against the tension of a spring which biased it into locking position. If it is desired to convert to plane type operation, the downward movement of the lever L is continued to the end of its travel of 135°.

During the first 20° of the downward movement of the lever L the following operations are effected. First, the rotor wing halves are alined as to their rotary angle of attack by operating the vertical so-called total control shaft 178 to neutralize the "total" control but leaving the horizontal rotor control operative for flight as gyro, if so desired; second, the rotor clutch 35' is disengaged and simultaneously the jet tail anti-torque motor is shut off; and third, the pitch of the traction propeller 10 is increased. After the first 5° of this 20° movement occurs the trigger cam 75 begins to rotate to the position where it can be picked up by the tripper 76 of the governor 79, and rotation of the trigger cam continues 25° until it has moved 45°. At this point lever L will have moved down a total of 50° and the lever L is locked in this position for gyro operation unless the pilot desires to convert back to helicopter or to continue the movement of the lever L for conversion for plane operation.

Assuming the pilot desires to continue conversion to plane operation the 15° movement of the lever L results in the following operations. The alining cam contacts rotor shaft under spring pressure and at the end of this 15° stops lever L from going further until the rotor shaft has stopped in proper position when this cam can enter the slot in the rotor shaft and thereby release lever L for further downward movement. The brake is put on by its toggle and when the rotor has slowed down to predetermined speed the governor 79 throws out the tripper 76 which trips cam 75 and allows pawl 46 to seat and then engage the notch 49 to stop the pulley 40. At the same time cam 100 is rotated and releases the brake 81. The next 65° operates the struts 6 into operative plane flying position during which time they aline the rotor in the horizontal plane. The next and final 5° of the down stroke of the lever L locks the struts by means of the latches 146.

It is understood that the drawings are for the purpose of exemplifying the principle of the invention and that the claims are not to be construed as limited to the particular means shown except where the particular means are specifically included therein.

I claim:

1. In a convertible aircraft of the character set forth, a lifting airfoil mounted for rotary movements and oscillatory movements on an axis at an angle to the axis of rotation and having its end portions variable in angles of incidence, means for varying the angles of incidence equally, means for varying the angles of incidence periodically and at different points in the rotation of the airfoil, a power transmission including a clutch for transmitting driving power to said airfoil, means responsive to the angle of incidence for controlling the power, an anti-torque motor for opposing the torque transmitted through said transmission, means for starting and stopping said anti-torque motor, means for varying the torque of the anti-torque motor responsively to the variations in torque of said transmission, a traction propeller having variable pitch blades, means for controlling the pitch of the blades, a brake for braking the rotation of the wing, speed governor control means controlling said brake, a motor for starting the rotation of said wing, means whereby energy is stored in said motor by the rotating wing at stopping, means for locking said wing against rotary and oscillatory movements, and a unitary control means for controlling each of the aforesaid means and operable in one direction for converting the craft from a fixed wing plane to either a gyro or a helicopter and movable in another direction to convert from either a helicopter or a gyro to a fixed wing plane.

2. In a convertible aircraft of the character set forth, an airfoil mounted for rotary movements and oscillatory movements on an axis at an angle to the axis of rotation and having its end portions variable in angles of incidence, means for varying the angles of incidence equally, means for varying the angles of incidence periodically, a transmission including a clutch for transmitting rotary power to said airfoil, means for locking said wing against rotary and oscillatory movements, and conversion control means movable in one direction to convert the craft from a helicopter to a gyro and then to a fixed airfoil craft and movable in another direction to convert the craft from a fixed airfoil plane to a gyro and then to a helicopter.

3. In a convertible aircraft capable of operation either as a gyro, a helicopter or a fixed wing craft, an airfoil mounted for rotary movements and oscillatory movements on an axis at an angle to the axis of rotation and having its halves variable in angles of incidence, means for varying the angles of incidence of the halves equally, means for varying the angles of incidence of the halves periodically, a transmission including a clutch for transmitting driving torque to said airfoil, traction power means, means for locking said airfoil against rotary and oscillatory movements, and conversion control means operable at will to convert said craft to either of said types of operation while in the air.

4. In a convertible aircraft of the character set forth, a lifting airfoil mounted for rotary movements and oscillatory movements on an axis at an angle to the axis of rotation and having its end portions variable in angles of incidence, means for varying the angles of incidence equally, means for varying the angles of incidence periodically, and at different points in the rotation of the airfoil, a power transmission including a clutch for transmitting driving power to said airfoil, means responsive to the angle of incidence for controlling the power, an anti-torque motor for opposing the torque transmitted through said transmission, means for starting and stopping said anti-torque motor, means for varying the torque of the anti-torque motor responsively to the variations in torque of said transmission, a traction propeller having variable pitch blades, means for controlling the pitch of the blades, a brake for braking the rotation of the wing, speed governor control means controlling said brake, a motor for starting the rotation of said airfoil, means whereby energy is stored in said motor by the rotating airfoil at stopping, and means for locking said wing against rotary and oscillatory movements.

5. In an aircraft, a convertible airfoil lifting surface mounted for rotary movements and oscillatory movements on an axis at an angle to the axis of rotation and capable of sustained operation either as a rotary driven surface or as an auto-rotating surface, said surface having its end portions variable in angles of incidence, means for varying the angles of incidence equally for vertical lift control, means for varying the angles of incidence periodically, power traction means, conversion means for converting said lifting surface from one type of operation to the other and means for neutralizing and restoring the means for varying the angles of incidence equally upon conversion from one type of operation to the other.

6. In an aircraft, a convertible airfoil lifting surface mounted for rotary movements and oscillatory movements on an axis at an angle to the axis of rotation and having portions variable in angles of incidence and being capable of sustained operation as either a rotary surface or as a fixed surface, means for varying the angles of incidence, means for locking said surface against rotary and oscillatory movements, conversion control means for converting from one type of operation to the other and means responsive to said conversion means for neutralizing and restoring said incidence control means upon such conversion.

7. In an aircraft, a convertible airfoil lifting surface mounted for rotary movements and oscillatory movements on an axis at an angle to the axis of rotation and capable of sustained operation either as a rotary driven surface, an auto-rotating surface or a fixed surface, said convertible surface having portions variable in angles of incidence, means for varying the angles of incidence equally, means for varying the angles of incidence periodically, means for arresting, orienting and locking said surface against rotary and oscillatory movements, conversion control means for converting from one type of operation to the other and means responsive to the conversion control for neutralizing and restoring the means for varying the angles of incidence equally and periodically.

8. In a convertible aircraft of the character set forth, a lifting airfoil mounted for rotary movements and oscillatory movements on an axis at an angle to the axis of rotation and having its halves variable in angles of incidence, means for varying the angles of incidence of the airfoil halves equally, means for varying the angles of incidence periodically and at different points in the rotation of the airfoil, a transmission including a clutch for transmitting driving torque to said airfoil, an anti-torque motor for opposing the torque transmitted through said transmission, means for starting and stopping said anti-torque motor, means for varying the torque of the anti-torque motor responsively to the variations in torque of said transmission, a traction propeller having variable pitch blades, means for varying the pitch of the blades, and means for stopping the anti-torque motor, disconnecting the clutch, increasing the propeller pitch and neutralizing the first named means for varying the angles of incidence for converting gyro operation and including means for starting the motor, connecting the clutch, decreasing the pitch, and reestablishing the angle varying means for converting to helicopter operation.

9. In a convertible aircraft of the character set forth, an airfoil mounted for rotary movements and oscillatory movements on an axis at an angle to the axis of rotation and having its halves variable in angles of incidence, means for varying the angles of incidence of the halves equally, means for varying the angles of incidence of the halves periodically, power means for transmitting driving torque to said airfoil, traction power means and means for converting said craft from gyro operation to helicopter operation and from helicopter to gyro, including means for neutralizing and re-establishing said first named angle of incidence varying means and controlling said power means.

10. In a convertible aircraft, a fuselage, a lifting aerofoil mounted for rotary movements, means for varying the angles of incidence of said rotary aerofoil, a fixed wing, ailerons on said wing and an elevator on said fuselage for controlling fixed plane operation, universally mounted means for operating said ailerons and said elevator, means for converting said craft from one type of craft to the other, and means responsive to said converting means for coupling the means for varying the angles of incidence to said universally mounted means upon converting to rotary plane operation and disengaging the same when converting back to fixed plane operation.

11. In a convertible aircraft, a lifting aerofoil mounted for rotary movements, means for controlling the angles of incidence of said rotary aerofoil when operating as a rotary type craft, lateral and longitudinal controls for said craft when operating as a fixed plane type craft, means for operating said lateral and longitudinal controls, means for converting said craft from one type of craft to the other, and means responsive to said converting means for coupling said means for controlling the angles of incidence to said means for operating said longitudinal and lateral controls upon conversion to rotary type operation and disengaging the same upon conversion back to fixed plane operation.

12. In a convertible aircraft, a lifting aerofoil mounted for either rotary movements and oscillatory movements on an axis at an angle to the axis of rotation or for fixed plane operation, means for varying the angles of incidence of the end portions of the aerofoil equally when rotating, devices for varying the angles of incidence to obtain unequal angles at certain points in the rotation, lateral and longitudinal controls for said craft when operating as a fixed plane type craft, a single universally movable control member for operating said lateral and longitudinal controls, means for converting said craft from gyro to fixed plane operation and from the latter back to gyro, means responsive to said last named means for aligning the aerofoil end portions, and neutralizing said devices upon conversion from gyro to fixed plane type operation and reestablishing said devices upon conversion to gyro operation, and means responsive to said conversion means for coupling to said member said devices upon conversion to gyro and disengaging the same upon conversion back to fixed plane operation.

13. In a craft of the character set forth in claim 12 wherein means are provided for converting the craft from helicopter to gyro and from gyro to helicopter operation together with means for neutralizing and reestablishing the means for varying the angles of incidence equally respectively upon said conversions to gyro and to helicopter.

14. In an aircraft, a convertible airfoil lifting surface mounted for rotary movements and oscillatory movements on an axis at an angle to the axis of rotation and capable of being locked against rotary and oscillatory movements for fixed surface operation, a control for said lifting surface while operating as a rotary surface, another control for said craft as a fixed surface craft and a common means under the control of the pilot for operating said controls.

15. In a craft of the character set forth in claim 14 wherein the control for fixed surface operation comprises both longitudinal and lateral controls.

16. In a craft of the character set forth in claim 14 wherein the control for fixed surface operation comprises both longitudinal and lateral controls and said rotor control comprises means for effecting both vertical lift control and periodic control.

17. In a convertible aircraft of the character set forth, an airfoil mounted for rotary movements and oscillatory movements on an axis at an angle to the axis of rotation and having its halves variable in angles of incidence, means for periodically varying the angles of incidence and resultant lifts of the halves to cause said airfoil to assume a desired plane of rotation, means for locking said airfoil against rotary movements and separate means for locking said airfoil against oscillatory movements.

18. In a convertible aircraft of the character set forth, an airfoil mounted for rotary movements and oscillatory movements on an axis at an angle to the axis of rotation and having its halves variable in angles of incidence, means for varying the angles of incidence of the halves, movable struts for locking the airfoil against oscillatory movements, and means for arresting the rotation of the airfoil and actuating and fastening said struts to the airfoil.

19. In a convertible aircraft of the character set forth, an airfoil mounted for rotary movements and oscillatory movements on an axis at an angle to the axis of rotation and having its halves variable in angles of incidence, means for varying the angles of incidence of the halves, struts pivotally mounted at one end for movements out of and into the path of the airfoil, means for arresting the rotation of the airfoil and means for moving and fastening the struts to the airfoil.

20. In a convertible aircraft, a lifting airfoil mounted for rotary movements and means for fastening said airfoil for fixed plane operation, comprising struts pivotally mounted at one end to occupy positions with the other ends out of the path of the rotating airfoil and other positions with said other ends disposed in grooves formed in the airfoil frame and firmly locked thereto, means for converting said lifting airfoil from fixed to rotary and from rotary to fixed plane operation and means responsive to said converting means actuating said struts.

21. In a convertible aircraft, a frame including a fuselage, a lifting airfoil mounted on said frame for rotary movements and oscillatory movements on an axis at an angle to the axis of rotation, a fixed wing beneath said rotary airfoil, means for arresting the rotation of said airfoil with the latter disposed transversely of the fuselage, a pair of struts pivotally fastened at their lower ends to the fixed wing at points laterally removed from the fuselage for pivotal movements in a transverse plane, and means for actuating said struts from positions with their upper ends out of the rotary path of the airfoil to positions to engage and level the arrested airfoil against oscillatory movements and then to positions with the struts firmly fastened to the airfoil, comprising complementary interlocking parts on the struts and the airfoil and roller guide means guiding the interlocking parts into cooperative fastening relation.

22. In a convertible aircraft, a frame including a fuselage, a lifting airfoil mounted on said frame for rotary movements and oscillatory movements on an axis at an angle to the axis of rotation, a fixed wing beneath said rotary airfoil, means for arresting the rotation of said airfoil with the latter disposed transversely of the fuselage, a pair of struts pivotally fastened at their lower ends to the fixed wing at points laterally removed from the fuselage for pivotal movements in a transverse plane, means for actuating said struts from positions with their upper ends out of the rotary path of the airfoil to positions to engage and level the arrested airfoil against oscillatory movements and then to positions with the struts firmly fastened to the airfoil, comprising complementary interlocking parts on the struts and the airfoil and roller guide means guiding the interlocking parts into cooperative fastening relation, and locking means for said interlocking parts, which is operated by the strut actuating means after the interlocking parts are brought into interlocking relation.

23. In an aircraft, a convertible airfoil lifting surface mounted for rotation, means for arresting the rotation and means for locking the lifting surface in fixed position for fixed surface operation comprising a pair of struts pivotally mounted at one end with their other ends disposed out of the path of the rotating lifting surfaces during rotary operation and movable to positions to engage and lock said lifting surface for fixed surface operation, means for converting said lifting airfoil from fixed to rotary and from rotary to fixed plane operation and means responsive to said converting means actuating said struts.

24. In a convertible aircraft of the character set forth, a lifting airfoil mounted for rotary movements and oscillatory movements on an axis at an angle to the axis of rotation and having its halves variable in angles of incidence, means for varying the angles of incidence of the airfoil halves, braking means for braking the rotation of the airfoil, speed governor control means controlling said brake responsively to the rotary speed of the airfoil, a motor for starting the rotation of said airfoil from rest, means whereby energy is stored in said motor by the rotating airfoil, means for locking said wing against rotary and oscillatory movements, and means setting said braking means for release by said governor and upon release coupling the rotating airfoil to the motor to store its energy of rotation therein.

25. In a convertible aircraft of the character set forth, a lifting airfoil mounted for rotary movements and oscillatory movements on an axis at an angle to the axis of rotation and having its halves variable in angles of incidence, means for varying the angles of incidence of the airfoil halves, braking means for braking the rotation of the airfoil, speed governor control means controlling said brake responsively to the rotary speed of the airfoil, a motor for starting the rotation of said airfoil from rest, means whereby energy is stored in said motor by the rotating airfoil, means for locking said wing against rotary and oscillatory movements, and means setting said braking means for release by said governor and upon release coupling the rotating airfoil to the motor to store its energy of rotation therein, comprising a drum and means for coupling the drum either to the airfoil or to the frame of the craft and said motor having a part thereof attached to said airfoil and a part to said drum.

26. In an aircraft of the character set forth, a rotary wing traction means for the craft, a tension motor for starting the rotation of said wing, and means for storing energy in the tension motor by the momentum of the rotating wing comprising means operable by the pilot in flight for connecting the motor to the rotating wing to energize the motor from the momentum of the rotating wing.

27. In an aircraft of the character set forth, a rotary wing, a reduction gearing coupled to said wing, traction means for the craft, a tension motor for absorbing energy from the rotating wing and starting the wing from rest, said tension motor being fastened at one side directly to the wing structure and fastened at its other side to said wing through said reduction gearing.

28. In an aircraft of the character set forth, a rotary wing, a tension motor for absorbing energy from the rotating wing and starting the wing from rest, said tension motor being fastened at one side to the wing structure and fastened at its other side to said wing through a reduction gearing, and means for locking the wing and tension motor to a fixed part of the craft frame and at the same time disconnecting the reduction gearing for storing energy in the motor, and connecting the gearing system and unlocking the wing and the motor from the fixed frame for starting the wing.

29. In a craft of the character set forth, a wing which is mounted for rotary movement but may be locked against rotation to the craft frame, a tension motor for starting the rotation of the wing having one side attached to the wing frame and its other side attached to a rotatable member which is also lockable to the craft frame, a reduction gearing between said last named member and said wing, and means for locking and unlocking said member from the craft frame and for unlocking and locking said member to an element of the reduction gearing system.

30. In a craft of the character set forth, a wing which is mounted for rotary movement but may be locked against rotation to the craft frame, a tension motor for starting the rotation of the wing having one side attached to the wing frame and its other side attached to a rotatable member which is also lockable to the craft frame, a reduction gearing between said last named member and said wing and means for locking and unlocking said member from the craft frame and for unlocking and locking said member to an element of the reduction gearing system, said reduction gearing system being greater than a 1:1 ratio.

31. In a craft of the character set forth in claim 29, a brake for slowing up the rotation of said wing and means for locking said member to the craft frame before the rotation of the wing is completely arrested to permit the continued rotation of the wing to store up energy in the motor.

32. In a craft of the character set forth in claim 29, a brake for slowing up the rotation of the wing, means for applying the brake and releasing it after a predetermined speed is reached, and means for locking said member to the craft frame to permit the continued rotation of the wing after the release of the brake to energize the motor.

33. In an aircraft, a convertible airfoil lifting surface mounted for rotary movement and being capable of being fixed for fixed surface operation, and means for arresting the rotation of the lifting surface comprising a brake for reducing the rotary speed of the lifting surface, means for releasing said brake at a predetermined rotational speed of said lifting surface above zero, and a separate braking means for reducing the rotary speed to zero.

34. In an aircraft, a convertible airfoil lifting surface mounted for rotary movement and being capable of being fixed for fixed surface operation, and means for arresting the rotation of the lifting surface comprising a brake for reducing the rotary speed of the lifting surface and a separate braking means for reducing the rotary speed to zero, said second braking means including a motor which is energized by the absorption of energy from the rotating lifting surface.

35. In an aircraft, a convertible airfoil lifting surface mounted for rotary movement and being capable of being fixed for fixed surface operation, and means for arresting the rotation of the lifting surface comprising a brake for reducing the rotary speed of the lifting surface and a separate braking means for reducing the rotary speed to zero and a speed governor determining the speed at which the second braking means comes into operation.

36. In an aircraft, a convertible airfoil lifting surface mounted for rotation and capable of being locked in fixed position for fixed surface operation, means for converting said lifting surface from rotary operation to fixed surface operation comprising two separate successively operating braking means and speed responsive means determining the shift from one braking means to another.

37. In an aircraft, a convertible airfoil lifting surface mounted for rotation and capable of being locked in a position for fixed surface operation, a tension motor for starting said lifting surface for rotary operation and conversion means for converting said lifting surface from rotary to fixed operation comprising a braking means adapted to partially arrest the rotation of the lifting surface, means for connecting said tension motor with the rotating surface to arrest said lifting surface and store the energy of the rotating surface in said tension motor and speed responsive means for determining when said tension motor is thus connected with the rotating surface.

38. In an aircraft, a convertible airfoil lifting surface mounted for rotary operation and capable of being locked in position for fixed surface operation and conversion means including means for first arresting the rotation of the lifting surface and then applying a reverse rotary movement to said lifting surface through a partial revolution for alining and locking the same in fixed operating position.

39. In an aircraft, a convertible airfoil lifting surface mounted for rotation and capable of being locked in fixed surface operating position, means for converting the surface from one type of craft to another and a tension motor for starting and stopping said lifting surface upon conversion.

40. In a convertible aircraft of the character set forth, a wing mounted for rotary movements and oscillatory movements on an axis at an angle to the axis of rotation, means for locking said wing against rotary and oscillatory movements, said wing having its halves variable in angles of incidence, means for varying and controlling said angles of incidence, a transmission including a clutch for transmitting driving torque to said wing, an anti-torque motor for opposing the torque in said transmission, means for starting and stopping said anti-torque motor including means for varying the torque responsively to the variations in torque of said transmission, a traction propeller having variable pitch blades, means for varying the pitch of the blades, braking means for braking the rotation of the wing, speed governor control means for controlling said braking means, a motor for starting the rotation of said wing, means whereby energy is stored in said motor by the rotating wing, and a unified control for converting the craft from a helicopter to a fixed plane type of craft by moving the unified control through a predetermined path of movement which first increases the power of the traction propeller, disengages said clutch, stops said anti-torque motor, neutralizes the rotor controls and aligns the rotor blades, then arrests the rotation of the wing by first braking the same down to a predetermined speed and by then storing energy in the starting motor and then after alignment of the wing transversely of the direction of pull of the traction motor, levelling the wing and locking it against oscillations.

41. In a convertible aircraft of the character set forth, a wing mounted for rotary and oscillatory movements, means for locking said wing against rotary movements and oscillatory movements on an axis at an angle to the axis of rotation, said wing having its halves variable in angles of incidence, means for varying and controlling said angles of incidence, a transmission including a clutch for transmitting driving torque to said wing, an anti-torque motor for opposing the torque in said transmission, means for starting and stopping said anti-torque motor including means for varying the torque responsively to the variations in torque of said transmission, a traction propeller having variable pitch blades, means for varying the pitch of the blades, braking means for braking the rotation of the wing, speed governor control means for controlling said braking means, a motor for starting the rotation of said wing, means whereby energy is stored in said motor by the rotating wing, and a unified control for converting the craft from a gyro to a fixed plane craft by movement through a predetermined path to neutralize the rotor control, then arresting the rotation of the wing by first applying said brake means until a predetermined speed of the wing is reached and by then storing energy in the starting motor and then after alignment of the wing transversely of the direction of pull of the traction motor levelling the wing and locking it against oscillations.

42. In a convertible aircraft of the character set forth, a wing mounted for rotary movements and oscillatory movements on an axis at an angle to the axis of rotation, means for locking said wing against rotary and oscillatory movements, said wing having its halves variable in angles of incidence, means for varying and controlling said angles of incidence, a transmission including a clutch for transmitting driving torque to said wing, an anti-torque motor for opposing the torque in said transmission, means for starting and stopping said anti-torque motor including means for varying the torque responsively to the variations in torque of said transmission, a traction propeller having variable pitch blades, means for varying the pitch of the blades, braking means for braking the rotation of the wing, manual control and speed governor means for controlling said braking means, a motor for starting the rotation of said wing, means whereby energy is stored in said motor by the rotating wing, and a unified control for converting said craft from a fixed wing type plane to a gyro by movement through a predetermined path which first releases the means locking the wing against oscillation and rotation and thereby permitting the starting motor to initiate the rotation of the wing.

43. In a convertible aircraft of the character set forth, a wing mounted for rotary movements and oscillatory movements on an axis at an angle to the axis of rotation, means for locking said wing against rotary movements, means for locking the wing against oscillatory movements, said wing having its halves variable in angles of incidence, means for varying and controlling said angles of incidence, a transmission including a clutch for transmitting driving torque to said wing, an anti-torque motor for opposing the torque in said transmission, means for starting and stopping said anti-torque motor including means for varying the torque responsively to the variations in torque of said transmission, a traction propeller having variable pitch blades, means for varying the pitch of the blades, braking means for braking the rotation of the wing, manual control and speed governor means for controlling said braking means, a motor for starting the rotation of said wing, means whereby energy is stored in said motor by the rotating wing, and a unified control for converting said craft from a fixed wing type plane to a gyro by movement through a predetermined path which first releases the means locking the wing against oscillation and rotation and thereby permitting the starting motor to initiate the rotation of the wing and releasing the controls, and then sets said clutch, reduces the pitch of the traction propeller, starts the anti-torque motor and releases the vertical controls.

44. In an aircraft, a main body, a convertible airfoil lifting surface mounted for rotary operation and capable of being locked in position for fixed surface operation, power means for rotating said lifting surface, a reaction motor for opposing the turning torque applied to said main body, conversion means for converting said lifting surface from one type of operation to another and a control for said reaction motor operatively responsive to said conversion means.

45. In a rotary airfoil aircraft, a frame, an airfoil mounted in said frame for rotation and being of variable angle of incidence on the opposite sides of the center of rotation, means for varying said angles of incidence, and a movable control unit for said means comprising a floating rotary ring which is operatively fastened to said means at spaced points thereof, rings fixed against rotation and journaled within said first named ring for adjusting the same with respect to the frame, and means for adjusting said non-rotating rings relatively to their planes.

46. In a rotary airfoil aircraft, a frame, a convertible airfoil mounted in said frame for rotation and being of variable angle of incidence on the opposite sides of the center of rotation, means for varying said angles of incidence, and a control for said means comprising a floating rotary ring which is operatively fastened to said means at spaced points thereof, a ring within said floating ring and fixed against rotation for moving the latter bodily without tilting the same and other rings within said rotating ring for tilting said floating ring about axes at an angle to each other, and means for adjusting said rings which are fixed against rotation so as to vary the position of said floating ring, and means for neutralizing said controls.

47. In a rotary airfoil aircraft, a frame, an airfoil mounted in said frame for rotation and being of variable angle of incidence on the opposite sides of the center of rotation, means for varying said angles of incidence, and a bodily movable control unit for said means comprising a floating rotary ring which is operatively fastened to said means at spaced points thereof, a ring within said floating ring and fixed against rotation for moving the latter bodily without tilting the same, and a pair of rings for tilting said floating ring about axes at right angles to each other, and means for independently adjusting said rings which are fixed against rotation so as to vary the position of said floating ring.

48. In a rotary airfoil aircraft, a frame, an airfoil mounted in said frame for rotation and being of variable angle of incidence on the opposite sides of the center of rotation, means for varying said angles of incidence, and a control for said means comprising a floating rotary ring which is operatively fastened to said means at spaced points thereof, a ring within said floating ring and fixed against rotation for moving the latter bodily without tilting the same and a pair of rings for tilting said floating ring about axes at right angles to each other, and means for independently adjusting said rings which are fixed against rotation so as to vary the position of said floating ring, comprising a control member movable longitudinally of itself to bodily actuate the floating ring without tilting the same and movable angularly in all directions to apply tilting movements to said floating ring.

49. In a rotary airfoil aircraft, a frame, an airfoil mounted in said frame for rotation and being of variable angle of incidence on the opposite sides of the center of rotation, means for varying said angles of incidence, a control for said means comprising a floating rotary ring which is operatively fastened to said means at spaced points thereof, a ring within said floating ring and fixed against rotation for moving the latter bodily without tilting the same and a pair of rings for tilting said floating ring about axes at right angles to each other, means for independently adjusting said rings which are fixed against rotation so as to vary the position of said floating ring, comprising a control member movable longitudinally of itself to bodily actuate the floating ring without tilting the same and movable angularly in all directions to apply tilting movements to said floating ring, and connections between the control member and the rings including a lever universally fastened to a fulcrum which is slidable generally in the direction of the lever's length and which lever is also operable transversely of itself about said fulcrum and three separate means transmitting longitudinal and transverse lever movements respectively to said non-rotating rings.

50. In a rotary airfoil aircraft, a frame, an airfoil mounted in said frame for rotation and being of variable angle of incidence on the opposite sides of the center of rotation, means for varying said angles of incidence, a control for said means comprising a floating rotary ring which is operatively fastened to said means at spaced points thereof, a ring within said floating ring and fixed against rotation for moving the latter bodily without tilting the same and a pair of rings for tilting said floating ring about axes at right angles to each other, means for independently adjusting said rings which are fixed against rotation so as to vary the position of said floating ring, means for locking said airfoil against rotation for operation as a fixed wing craft, and means for neutralizing said ring adjusting means.

51. In a rotary airfoil aircraft, a frame, an airfoil mounted in said frame for rotation and being of variable angle of incidence on the opposite sides of the center of rotation, means for varying said angles of incidence, and a control for said means comprising a floating rotary ring which is operatively fastened to said means at spaced points thereof, a ring within said floating ring and fixed against rotation for moving the latter bodily without tilting the same and a pair of rings for tilting said floating ring about axes at right angles to each other, means for independently adjusting said rings which are fixed against rotation so as to vary the position of said floating ring, means for operating said airfoil either as a helicopter or a gyro and means for neutralizing the ring which moves the floating ring bodily when the craft is operated as a gyro.

52. In an aircraft, a frame, a rotary lifting surface mounted on said frame for pivoting movements in vertical planes and spring means interposed between the frame and the surface and cushioning the pivoting movements of the rotary surface as a unit upon the latter approaching predetermined positions.

53. In an aircraft, a convertible lifting surface operable either as a rotary surface or as a fixed surface and means for arresting and orienting the lifting surface for fixed surface operation including means for imparting to the convertible surface a reverse movement through a partial revolution after coming to rest to bring the surface to the alined position.

54. In an aircraft, a convertible airfoil lifting surface mounted for rotary movement and being capable of being fixed in a predetermined alined position for fixed surface operation, and means for arresting the rotation of the lifting surface comprising a brake for reducing the rotary speed of the lifting surface and a separate braking means for reducing the rotary speed to zero, said second named braking means not only bringing the rotor to rest but also being capable of reversing the lifting surface for a partial revolution if the lifting surface is not arrested at the alined position.

55. In an aircraft, a frame, a rotary lifting surface mounted on said frame for pivoting movements in vertical planes and spring means interposed between the frame and the surface and cushioning the pivoting movements of the rotary surface upon the latter approaching predetermined positions comprising a spring member and upper and lower stops for limting free movement of said member held between the stops.

56. In an aircraft, a convertible airfoil lifting surface mounted for rotary movement and being capable of being fixed in a predetermined alined position for fixed surface operation and means for arresting the rotation of the lifting surface and bringing it to rest in fixed surface operating position comprising rotation retarding means to bring the rotary lifting surface to rest, together with means for imparting to the lifting surface a further rotary movement through at least a partial revolution to bring the rotor into alined position.

57. In an aircraft of the character set forth in claim 56 wherein the movement imparted to the lifting surface for bringing it to the alined position after it has first come to rest is a reverse rotation movement and means are provided for stopping the rotor in the alined position during the reverse rotary movement and locking the rotor in this position.

58. In an aircraft of the character set forth in claim 56 wherein the movement imparted to the lifting surface for bringing it to the alined position after it has first come to rest is a reversed rotation movement and means are provided for stopping the rotor in the alined position during the reverse rotary movement and locking the rotor in this position, said rotating arresting means being a tension motor which is energized by the arresting operation of the wing.

59. In an aircraft of the character set forth, a rotary wing, a gearing coupled thereto, a tension motor having means on one side for attachment to the wing frame structure and means on the other side for fastening to said gearing for absorbing energy from the rotating wing and for starting the wing from rest, said tension motor having its attaching means fastened to the wing frame structure and its gearing fastening means fastened to the gearing.

60. In an aircraft of the character set forth, a rotary wing, a gearing coupled thereto, a tension motor having means on one side for attachment to the wing frame structure and means on the other side for attachment to a fixed element for absorbing energy from the rotating wing and means for releasing said fixed element and coupling to the gearing for transmitting the absorbed energy from the tension motor through said gearing to said wing for starting it in the normal operating direction.

61. In an aircraft, an airfoil for operation as a fixed wing and as a rotary wing, power means for operating the rotary wing, means for converting from rotary wing operation to fixed wing operation and a reaction motor, and means connected with said converting means for operating said reaction motor in rotary wing operation and rendering said motor inoperable in fixed wing operation.

62. In an aircraft having at least one wing for operation as a rotary wing and as a fixed wing, braking means for stopping rotation of the wing, and a governor connected to said wing and responsive to the speed of rotation thereof and arranged to render said braking means operative when the speed of rotation of said wing falls to a predetermined level.

GERARD P. HERRICK.

(References on following page)

REFERENCES CITED

The following references are of record in the file of this patent:

UNITED STATES PATENTS

| Number | Name | Date |
|---|---|---|
| 1,485,704 | Pescara | Mar. 4, 1924 |
| 1,546,313 | Pescara | July 14, 1925 |
| 1,792,014 | Herrick | Feb. 10, 1931 |
| 1,793,651 | Thorsen | Feb. 24, 1931 |
| 1,815,758 | Bowling | July 21, 1931 |
| 1,852,929 | Hojnowski | Apr. 5, 1932 |
| 2,098,019 | Weimerskirch | Nov. 2, 1937 |
| 2,198,941 | Jacobs | Apr. 30, 1940 |
| 2,256,635 | Young | Sept. 23, 1941 |
| 2,317,340 | Bennett | Apr. 27, 1943 |
| 2,322,715 | Kloeren | June 22, 1943 |
| 2,350,126 | Pircairn | May 30, 1944 |
| 2,369,048 | Hays | Feb. 6, 1945 |

FOREIGN PATENTS

| Number | Country | Date |
|---|---|---|
| 687,482 | France | Apr. 28, 1930 |